(12) United States Patent
Hirata et al.

(10) Patent No.: US 8,733,953 B2
(45) Date of Patent: May 27, 2014

(54) DISPLAY APPARATUS AND PROJECTION TYPE LIGHTING APPARATUS THEREFOR

(75) Inventors: Koji Hirata, Yokohama (JP); Masahiko Yatsu, Fujisawa (JP); Takanori Hisada, Yokohama (JP); Hidehiro Ikeda, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 526 days.

(21) Appl. No.: 13/021,101

(22) Filed: Feb. 4, 2011

(65) Prior Publication Data

US 2011/0128472 A1    Jun. 2, 2011

Related U.S. Application Data

(63) Continuation of application No. 12/030,899, filed on Feb. 14, 2008, now Pat. No. 7,901,097.

(30) Foreign Application Priority Data

Feb. 28, 2007    (JP) .................................. 2007-048335

(51) Int. Cl.
*G03B 21/20* (2006.01)

(52) U.S. Cl.
USPC ................. 353/122; 353/20; 353/98; 359/457

(58) Field of Classification Search
CPC ........... G02F 1/1335; G03B 7/60; G02B 3/08
USPC .................. 353/20, 98, 122; 359/452–457
See application file for complete search history.

(56) References Cited

U.S. PATENT DOCUMENTS 6,157,419 A * 12/2000 Mitsutake .......................... 349/9
6,454,413 B1 * 9/2002 Vaan De ......................... 353/20
(Continued)

FOREIGN PATENT DOCUMENTS

CN    1431555    7/2003
JP    6-230367    8/1994
(Continued)

OTHER PUBLICATIONS

Office Action in Japanese Patent Application No. 2007-048335, dated Aug. 7, 2012, with a partial English translation thereof.

*Primary Examiner* — Seung C Sohn
(74) *Attorney, Agent, or Firm* — Antonelli, Terry, Stout & Kraus, LLP.

(57) ABSTRACT

A display apparatus includes a light source which is configured to emit a light, a first light modulation unit which is configured modulate the light emitted from said light source, a first drive unit which is configured to drive said first light modulation unit, a projection unit, which is configured to project the light from said first light modulation unit enlargedly, a second light modulation unit, which is configured to modulate the light emitted from said projection unit so as to be emitted to an observer side, a second drive unit which is configured to drive said second light modulation unit, and an optical direction conversion unit, which is configured to convert the light from said projection unit so that the light is incident upon an incident surface of said second light modulation unit in a direction approximately perpendicular thereto.

16 Claims, 15 Drawing Sheets

(56) References Cited

U.S. PATENT DOCUMENTS

| | | |
|---|---|---|
| 7,575,327 B2 | 8/2009 | Uchiyama |
| 2003/0142275 A1 | 7/2003 | Yoshida |
| 2004/0190149 A1* | 9/2004 | Lian et al. .................. 359/629 |
| 2005/0105177 A1 | 5/2005 | Suzuki et al. |
| 2006/0227299 A1 | 10/2006 | Hisada et al. |
| 2006/0227432 A1 | 10/2006 | Yoshikawa et al. |
| 2007/0182932 A1* | 8/2007 | Bakker et al. .................. 353/20 |

FOREIGN PATENT DOCUMENTS

| | | |
|---|---|---|
| JP | 2003-149730 | 5/2003 |
| JP | 2005-234539 | 9/2005 |
| JP | 2006-30588 | 2/2006 |
| JP | 2006-292900 | 10/2006 |
| JP | 2006-292901 | 10/2006 |
| WO | WO 2004/049059 | 6/2004 |

* cited by examiner

IMAGE SIGNAL

DISPLAY APPARATUS AND PROJECTION TYPE LIGHTING APPARATUS THEREFOR

CROSS REFERENCE TO RELATED APPLICATION

This application is a continuation of U.S. application Ser. No. 12/030,899, filed Feb. 14, 2008, now U.S. Pat. No. 7,901, 097, the contents of which are incorporated herein by reference.

BACKGROUND OF THE INVENTION

The present invention relates to a direct-view type display apparatus for forming a picture (i.e., an optical image) through modulating the light strength or intensity of a light emitted from a slight source (hereinafter, being abbreviated "light modulation") by means of a light modulation unit, such as, a liquid crystal panel, etc., and it relates to, in particular, a lighting apparatus for achieving an increase of contrast of the display picture by adjusting an amount of the lights to be irradiated from the light source mentioned above onto the light modulation unit.

In recent years, accompanying with stoppage of the terrestrial analog television (TV) broadcasting, which is planned in the year 2011, in Japan, a direct-view type video display apparatus of a large or wide screen is spreading, widely, which can receive the terrestrial digital television (TV) broadcasting of high definition (for example, 1,920×1,080 pixels) that was already started.

In general, as a display panel to be used in the direct-view type video display apparatus is applied a PDP (Plasma Display Panel) or a liquid crystal panel, etc., for example, but the liquid crystal panel is inferior in the contrast (or being called "contract ratio") thereof, by around a single digit, comparing to that of the PDP. Then, within the video display apparatus applying the liquid crystal panel therein is applied a light-modulation technology, for controlling a lighting apparatus of illuminating the liquid crystal panel from a rear surface thereof, upon basis of an averaged brightness a black level area and a white level area of the picture, which are detected from a video signal, and thereby increasing the contrast thereof.

As the technologies relating to the light-modulation are already known, for example, so-called a back-light control, for chaining an amount of lights emitted from the light source (for example, please see the following Patent Document 1), and a control for changing an amount of lights emitted from the light source by means of a liquid crystal panel (for example, please see the following Patent Document 2), etc.
[Patent Document 1] Japanese Patent Laying-Open No. 2006-30588 (2006); and
[Patent Document 2] Japanese Patent Laying-Open No. Hei 6-230364 (1994).

BRIEF SUMMARY OF THE INVENTION

The Patent Document 1 discloses therein a technology for forming a well-modulated picture through conduction of the back-light control by a unit of each pixel with applying a LED (Light Emitting Diode) to the light source. However, if trying to make one (1) pixel of the liquid crystal panel corresponding to one (1) piece of LED, then a very huge number of LEDs are necessary, since the number of the pixels is 1,920×1,080, and there is a possibility of brining about a large cost-up. Of course, even if trying to make a plural number of the pixels corresponding to one (1) piece of LED, but a considerable number of LEDs are necessary, by taking a control of high picture quality into the consideration thereof, and it is impossible to avoid a great cost-up therefrom. In particular, since the number of pixels is lessened corresponding to one (1) piece of LED, accompanying with large-scaling or widening of the of the display screen size (for example, 37 through 60 inches), therefore, there is a possibility of increasing the cost-up, remarkably.

Also, in the Patent Document 2, a liquid crystal panel for changing the amount of lights emitted from the light source is disposed between the light source and a liquid crystal panel for use of video display (i.e., image forming) (hereinafter, being called an "image display liquid crystal panel", for distinguishing it from a liquid crystal panel that will be mentioned later). With this technology, the amount of lights irradiating from the light source upon the liquid crystal panel is changed by a same control amount over the entire range. Inventors of the present invention noticed that modulation can be made on the brightness (i.e., luminance) depending on the number of pixels of the liquid crystal panel with using the present technology, during the processes for advancing the study about this technology. However, if applying it into the direct-view type video display apparatus, there is necessity of providing a panel, being same to the video display liquid crystal panel in the size thereof, as the liquid crystal panel, and this brings about the cost-up, too. This cost-up comes remarkable accompanying with the large-scaling or widening of the display screen size. Also, because of using the liquid crystal panel for the light modulation, it is necessity to dispose a polarizing plate on an incident side thereof, and an about half of the light emitting from the light source is not used therein, then it has also a drawback that the brightness is dimmed or comes dark.

The present invention, accomplished by taking the drawback mentioned above into the consideration thereof, and an object thereof is to provide a light modulation technology for enabling to obtain a picture of high quality with a low cost and for increasing thereof.

For accomplishing the objection mentioned above, according to the present invention, there is provided a display apparatus, comprising a first light modulation unit for use of video display, and a second light modulation unit having a surface smaller than that of said first light modulation unit for use of video display, for modulating lights from a light source, wherein the lights modulated on said second light modulation unit is enlargedly projected on the first light modulation unit.

With such the structures as was mentioned above, it is possible to modulate the lights emitted from the light source, by a unit of pixel, through the second light modulation unit, and also to reduce the size of the second light modulation unit to be small, and therefore it is possible to achieve the light modulation of high accuracy with a low const.

Also, between the light source and the second light modulation unit, there may be provided a polarization light conversion unit for converting the lights from the said light source into a polarized light component polarized into a desired direction. With this, it is possible to align the lights emitting from the light source without polarization into a predetermined direction of polarized light, and thereby enabling to use the lights from the light source, with high efficiency.

Thus, according to the present invention, it is possible to obtain a picture or image of high picture quality with a low cost.

BRIEF DESCRIPTION OF THE DRAWINGS

Those and other objects, features and advantages of the present invention will become more readily apparent from the following detailed description when taken in conjunction with the accompanying drawings wherein.

DESCRIPTION OF THE PREFERRED EMBODIMENTS

Figure 1:
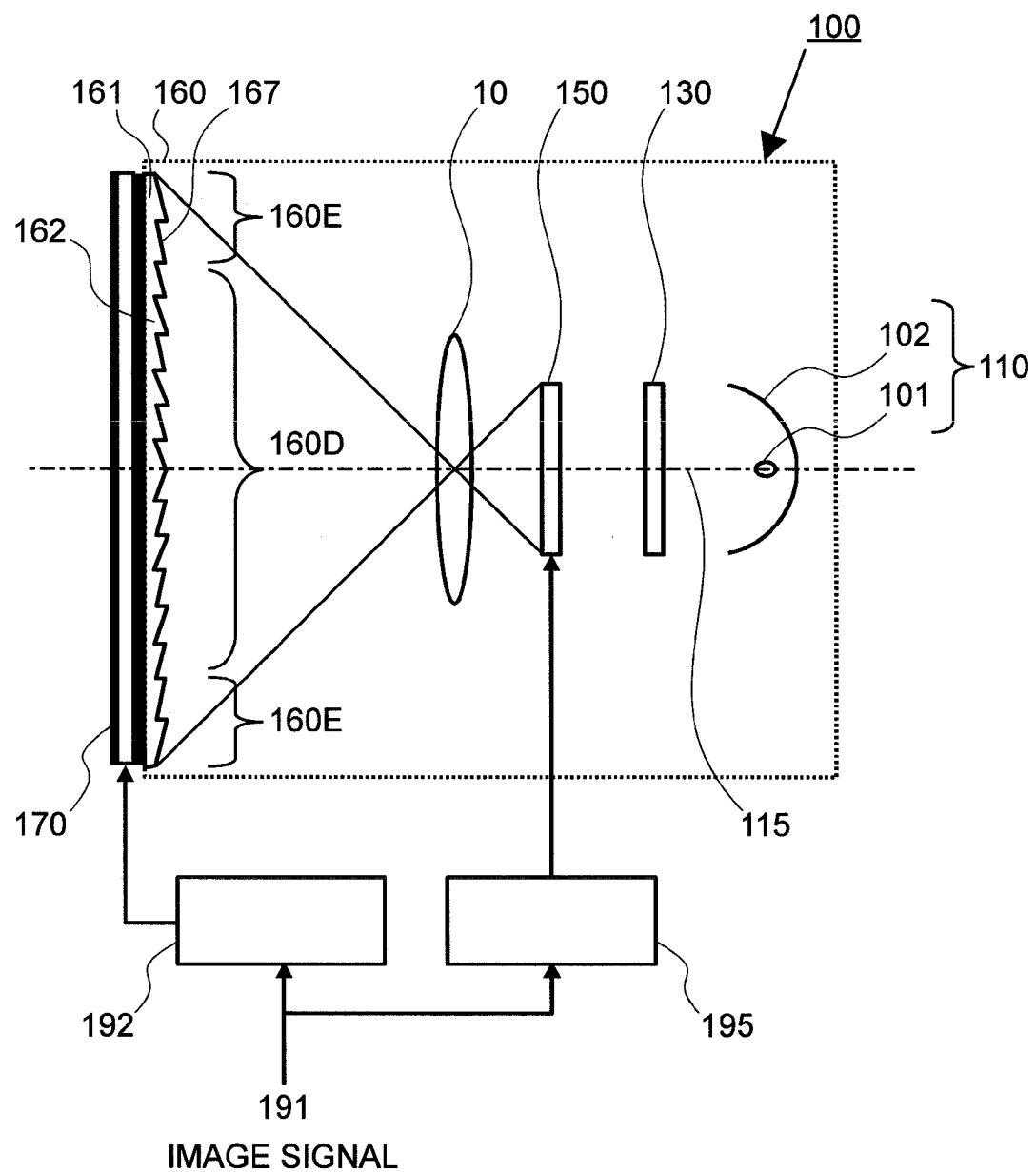
FIG. 1 is a view for diagrammatically showing the structures of a lighting apparatus, according to an embodiment of the present invention.

Hereinafter, embodiments according to the present invention will be fully explained by referring to the attached drawings. However, in each of the drawings, an element having a common function is shown attached with a same reference numeral, and expiation will be omitted from being duplicated upon that, which is explained once.

Within a lighting apparatus according to the present embodiment, as a light modulation portion, for changing or modulating an amount of lights emitted from a light source, is applied a light modulation unit for use of illumination or lighting, i.e., modulating the intensity of the incident light depending on a video signal, being small comparing to the size of the modulation unit of the light for use of video display. And, it is characterized in such the structures that a light beam, being modulated through the light modulation for each pixel within the light modulation unit, is enlarged by a projection device, thereby illumination or lighting the light modulation unit for use of video display. According to the present embodiment, because the light modulation unit being sufficiently small is applied as a light modulation portion or unit for changing the mount of lights emitted from the light source, therefore it is possible to obtain a lighting apparatus with a low cost.

FIG. 1 is a structure view for showing the lighting apparatus, according to one embodiment of the present invention, diagrammatically. In this FIG. 1, for easy understanding thereof, each of the structural elements is diagrammatically shown, but neglecting the actual sizes thereof. Also, in the embodiments, which will be shown below, explanation will be made on an example of using a transmission-type liquid crystal panel as the light modulation unit.

In FIG. 1, the light device 100, according to the present embodiment, for illuminating an image display liquid crystal panel 170 of conducting a color display, as a first light modulation part from the rear surface thereof, includes a light source 110, disposed in a sequence toward the image display liquid crystal panel 170, for emitting an almost white color light, a polarized light conversion element 130 as a polarized light conversion unit for aligning the lights emitted from the light source 110 without polarization into a light component polarized into a desired direction, a liquid crystal panel 150 as a second light modulation unit for light modulating the light (i.e., the white color light) from the polarized light conversion element 130, a projection device 10 for projecting the light beam modulated on the liquid crystal panel 150 while enlarging it, directing to the image display liquid crystal panel 170, and a Fresnel lens sheet 160 as a light direction conversion part for converting such that the light beam from the projection device 10 is incident upon an incident surface of the image display liquid crystal panel 170 at around right angle (90 degree).

The image display liquid crystal panel 170 modulates (i.e., modulation of light intensity) the light irradiated from the lighting apparatus 100 upon basis of a video signal 191, through a panel driver circuit 192, thereby building up a picture light (color) of the display image, to be emitted. Herein, it is a liquid crystal panel of TFT (Thin Film Transistor) type to be applied as a large screen liquid crystal TV of direction-view type, having a ratio between the vertical and the horizontal 16:9, a number of pixels 1,920×1,080, a screen size (a diagonal size L1 of an effective image display region) 27 to 60 inches, for example. In general, a contrast ratio of the TFT-type liquid crystal panel is nearly 1000:1. Further, though the image display liquid crystal panel 170 has a polarizing plate on both the incident side and the emission side thereof, but are omitted from being depicted in the figure.

The light source 110 has a lamp 101, such as, a high-pressure mercury lamp, having high brightness or luminance, for emitting a nearly white light, etc., for example, and includes a reflector 102 having a rotationally parabolic configuration covering the lamp 101 from the rear thereof, for reflecting the white light from the lamp 101, so as to convert it into parallel lights. In the present embodiment, as will be mentioned later, since the lights emitted from the light source 110 is irradiated upon the liquid crystal panel 150 for use of lighting, i.e., conducting light modulation for the purpose of increasing the contrast through the light modulation, which is sufficiently small comparing to the image display liquid crystal panel 170, therefore it is possible to apply a discharge lamp, such as, the high-pressure mercury lamp, etc.

The light emitted from the lamp 101 is reflected upon the reflector 102, having a reflection surface of rotationally parabolic configuration, for example, and thereby being almost parallel to an optical axis 115; i.e., almost parallel light beam is emitted from the light source 110. The light emitted from the light source 110 is incident upon the polarized light conversion element 130.

The polarized light conversion element 130 aligns the lights emitted from the light source 110 without polarization, into a light, which is polarized into a predetermined polarization direction. The light polarized into the predetermined polarization direction through the polarization conversion element 130 is incident upon the liquid crystal panel 150.

The liquid crystal panel 150 conducts the light modulation (i.e., the modulation of light intensity) upon basis of the video signal 191 through the panel driver circuit 195, and builds up the optical image having light and shade for each of the pixels (hereinafter, being called "light modulation image"). Herein, for the purpose of reducing a panel cost, it is assumed to apply a TN-type liquid crystal panel (i.e., the transmission type liquid crystal panel of single matrix drive, having a horizontal/vertical ratio 16:9, the number of pixels of WVGA 852× 480 (the number of pixels of WQVGA 400×240 may be applied when giving priority onto the cost), the screen size (a diagonal size L2 of an effective image display region) 0.4 to 1.3 inches, for example.

As such liquid crystal panel can be applied a liquid crystal panel, which is used in a display apparatus of rear-surface projection type, for example. Normally, the liquid crystal panel applied in such the rear-surface projection type display apparatus, is supplied with any one of R, G and B signals corresponding to red, green and blue images for the purpose of full color display. However, according to the present embodiment, since it is sufficient for the liquid crystal panel 150 to modulate the light intensity for each of the pixels (no necessity of taking the full color display into the consideration), a brightness or luminance signal (Y signal) is supplied thereto, but not the R, G and B signals. Thus, within the present embodiment, to the image display liquid crystal panel 170 are supplied the R, G and B signals from the panel driver circuit 192, but as the video signal, while to the liquid crystal panel 150 is the luminance signal from the panel driver circuit 195 as the video signal. As such the luminance signal may be used a signal, which is separated within a Y/C circuit not shown in the figure and further is conducted with predetermined signal processes (for example, a contrast adjustment, a gamma compensation, etc.) thereupon within a video processing circuit not shown in the figure. It is also possible to apply a Y signal that is obtained with conducting a matrix calculation upon the R, G and B signals supplied to the image display liquid crystal panel 170. Of course, it is also possible to supply any one of the R, G and B signals to the liquid crystal panel 150 for use of lighting, one by one, periodically.

In general, the contrast ratio of the TN type liquid crystal panel is about 700:1, i.e., being lower than that of the TFT type. However, according to the present invention, since the contract ratio comes to be the product of the contrast ratio of the liquid crystal panel 150 and the contrast ratio of the image display liquid crystal panel 170, then it is possible to increase the contrast ratio, greatly, while using a cheap panel. Also, for the purpose of lowering the panel price is applied a WVGA panel, the resolution of which is lowered comparing to that of the image display liquid crystal panel 170. Accordingly, although one (1) pixel of the liquid crystal panel 150 corresponds to a plural number of pixels of the image display liquid crystal panel 170, but since the size of the corresponding pixel region is sufficiently small if being small in the number of the corresponding pixels, it is fully possible to accept to be a high-accuracy adjustment of lighting or illumination. Further, though the liquid crystal panel 150 has the polarizing plate on both the incident side and the emission side thereof, however the illustration of them is omitted in the figure.

The panel driver circuit 195 has a scaling function (not shown in the figure), i.e., conducting the video processing, such as, the scaling, etc., upon the video signal 191, corresponding to the resolution of the liquid crystal panel 150. Thereafter, with using well-known video information analysis function (not shown in the figure), such as, averaged brightness information, black level region detection, white level area detection, etc., for example, a light modulation image (i.e., an optical image) is made up from those information, being optically modulated in the luminance thereof, while driving the liquid crystal panel 150 with those information. Or, it is also possible to supply the brightness signal (after being treated with the scaling process, corresponding to the resolution of the liquid crystal panel 150, depending on necessity) to the liquid crystal panel 150, corresponding to the R, G and B signals, which are supplied to the image display liquid crystal panel 170.

The projection device 10 projects the light modulation image, which is formed on the liquid crystal panel 150, toward the image display liquid crystal panel 170, while enlarging it. However, if applying the projection device therein, the size of depth of the image display apparatus comes to be thick. Then, though the details thereof will be mentioned later, there is applied an oblique projection, for the purpose of making the size of depth as thin as possible.

By the way, since the projection device 10 projects the light modulation image of the liquid crystal panel 150 onto the image display liquid crystal panel 170, it must satisfy the following condition:

$$10 < L1/l2 < 150 \qquad \text{(Eq. 1)}$$

The liquid crystal panel, the smallest one at the present, is about 0.48 inch (in the diagonal size thereof), then it can be considered that a limit thereof is about 0.4 inch. Then, the screen size of the liquid crystal panel 150 is L2=0.4, while the screen size of the image display liquid crystal panel 170 is L1=60, then L1/l2=150. If L1/l2 exceeds 150, then there is brought about a problem that the brightness irradiated upon the image display liquid crystal panel 170 comes to dark. Therefore, it is preferable that L1/l2 is equal to or less than 150. With a lower limit thereof, though depending on the screen size of the liquid crystal panel 150, but it is preferable to determine L1/l2 to be equal to or greater than 10, at least, since not resulting into cost down if approaching it to the screen size of the image display liquid crystal panel 170. If applying a liquid crystal panel of the screen size L2=1.3 inch, near to the upper limit that can be applied within the general projection-type image display apparatus, as the liquid crystal panel 150, while determining the screen size of the image display liquid crystal panel 170 to L1=27 to inches, then L1/l2=150, approximately, then it is possible to satisfy the condition mentioned above.

The Fresnel lens sheet 160 is an optical direction conversion unit, for converting an oblique light from the projection device 10 such that it is incident upon the incident surface of the image display liquid crystal panel 170, almost vertically. Upon one surface of a material 161 building up the Fresnel sheet 160 (herein, a surface opposite to the side surface of the image display liquid crystal panel 170), there are formed a plural number of refraction type Fresnel lenses 162, for refracting the lights, being incident thereon at the incident angle within a predetermined value, thereby emitting, and also total-reflection type Fresnel lenses 167, for totally reflecting the lights, being incident thereon at the incident angle larger than that predetermined value, concentrically. And, the lights from the projection device 10 are refracted or totally reflected, upon the refraction type Fresnel lenses 162 or the total-reflection type Fresnel lenses 167, depending on the incident angle thereof, so that they are incident upon the incident surface of the image display liquid crystal panel 170, almost vertically (the details thereof will be mentioned later).

As was mentioned above, within the present embodiment, the light modulation is conducted upon the video signal upon basis of video signal, while corresponding one (1) piece of the pixel on the liquid crystal panel 150 to the plural number of the pixels on the image display liquid crystal panel 170, with using the liquid crystal panel 150 being small in the size thereof, and thereby forming the light modulated image. And, that light modulated image is enlarged by means of the projection, and is projected upon the image display liquid crystal panel 170. With this, the contrast ratio, obtainable as the video display apparatus as the whole thereof, comes to the product of the contrast ratio of the liquid crystal panel 150 and the contrast ratio of the image display liquid crystal panel 170, and therefore it is possible to increase the contrast ratio, greatly.

On the other hand, it is possible to apply the liquid crystal panel 150, being sufficiently small comparing to the image display liquid crystal panel 170, and in addition thereto, it is also possible to reduce the size of the light source 110. Accordingly, comparing to the conventional technology of using the light source (i.e., a back light) therein, i.e., being built up with an expensive liquid crystal panel same in the size to the image display liquid crystal panel 170, and disposing a plural number of LEDs in parallel with, it is possible to reduce the cost of the lighting apparatus down to ⅔ to ½, since there can be applied a liquid crystal panel of low resolution, in spite of addition of the projection device and/or the Fresnel lenses.

Further, applying the liquid panel 150 and the light source 110 of exchangeable methods, respectively, enables to increase the capability of services.

Although the one (1) pixel of the liquid crystal panel is made corresponding to the plural number of pixels of the image display liquid crystal panel in the above, however, the present invention should not be restricted only to this, but it is needless to say that the one (1) pixel of the liquid crystal panel corresponds to one (1) pixel (the one (1) pixel including a set of R pixel, G pixel, and B pixel) of the color image display liquid crystal panel.

Also, though applying the high-pressure mercury lamp therein, however there may be applied a LED or a laser device of white color light. In case where an amount of the light is short with such one piece of the LED or a laser light, there may be applied one of arranging a plural number of LEDs or laser devices.

Also, though applying the transmission type liquid crystal panel as the light modulation unit for light modulation, but in the place thereof, it is also possible to apply a reflection type light modulation element, such as, a liquid crystal panel (LCOS: Liquid Crystal on Silicon), or minute mirrors, etc., for example.

Next, explanation will be made on an embodiment of the projection device. Herein, for the purpose of bringing the depth size of the image display apparatus as thin as possible, there is applied a projection device, which is described in Japanese Patent Laying-Open No. 2006-292900 (2006) filed by the present inventors.

Figure 2:
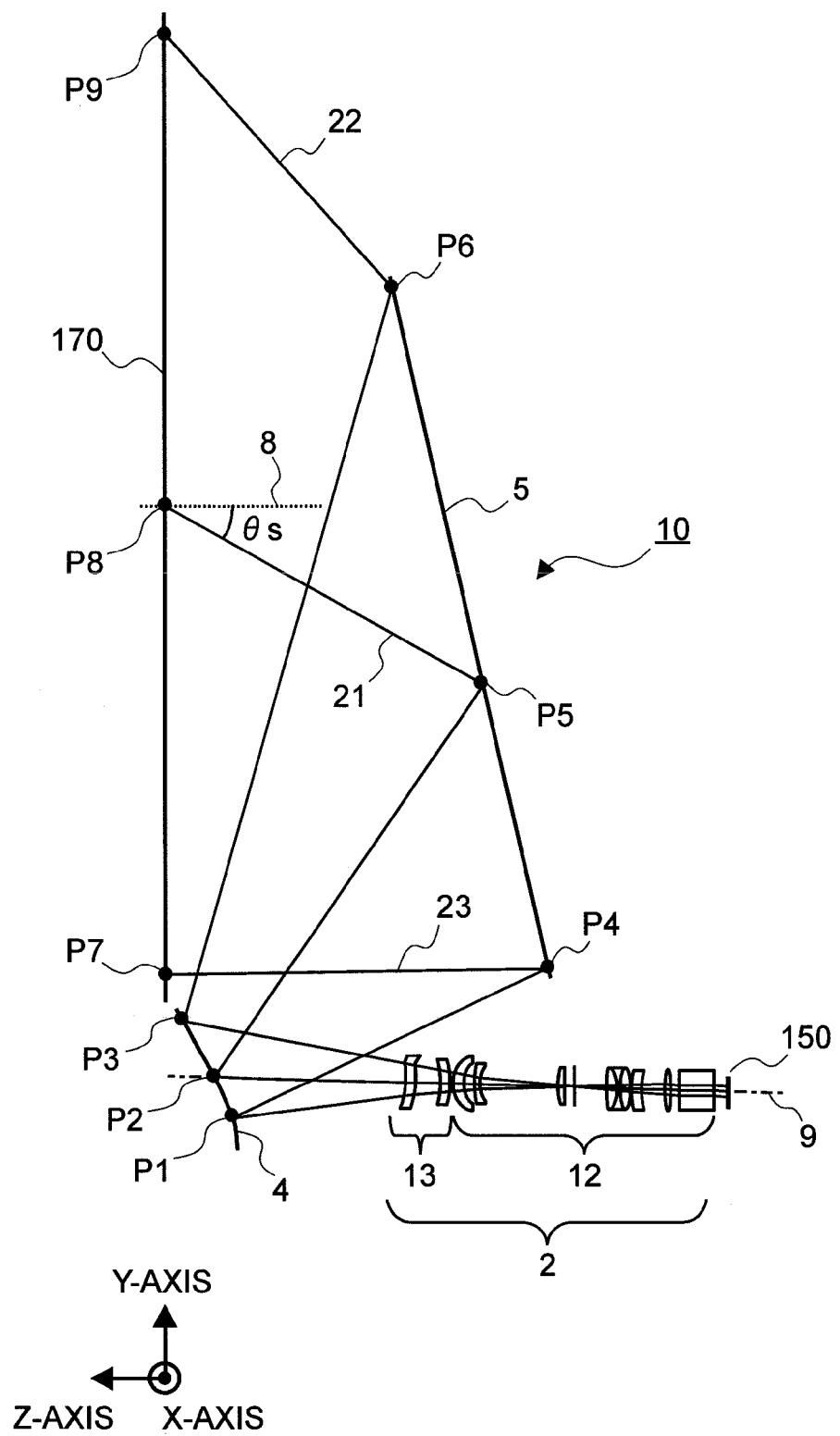
FIG. 2 is a cross-section view for showing the structures of a basic optic system, according to the present invention.
Figure 3:
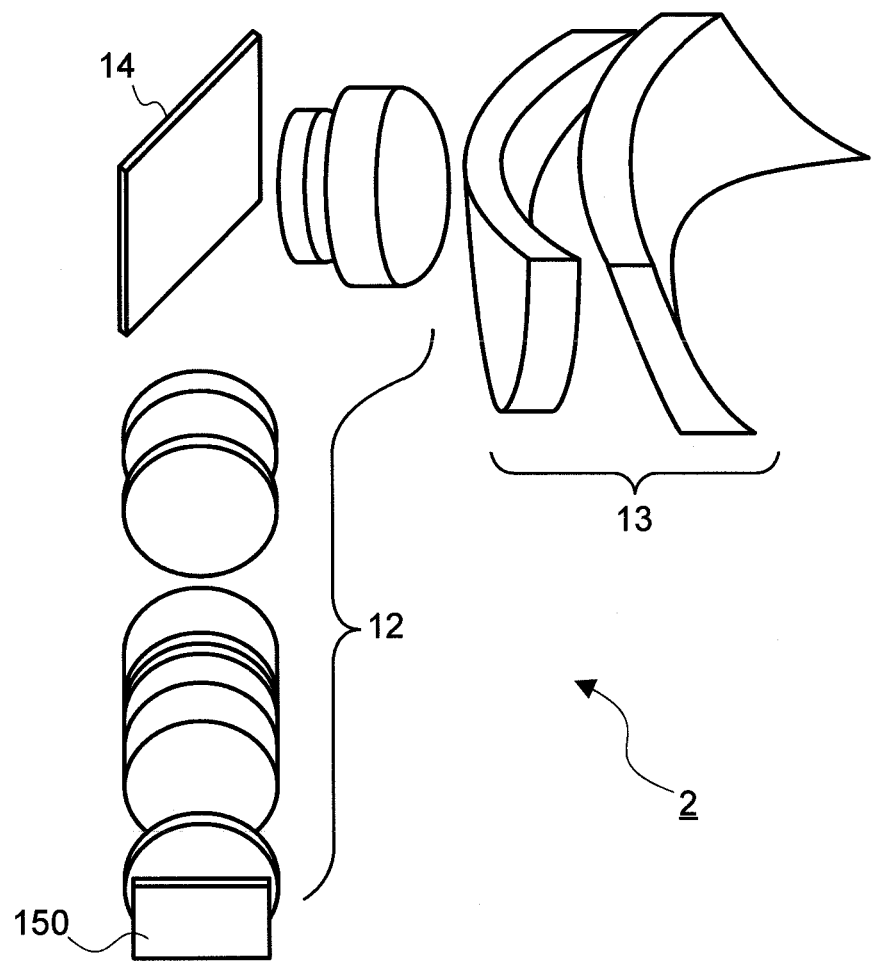
FIG. 3 is perspective view of projection lenses for building up a projection apparatus.
Figure 4:
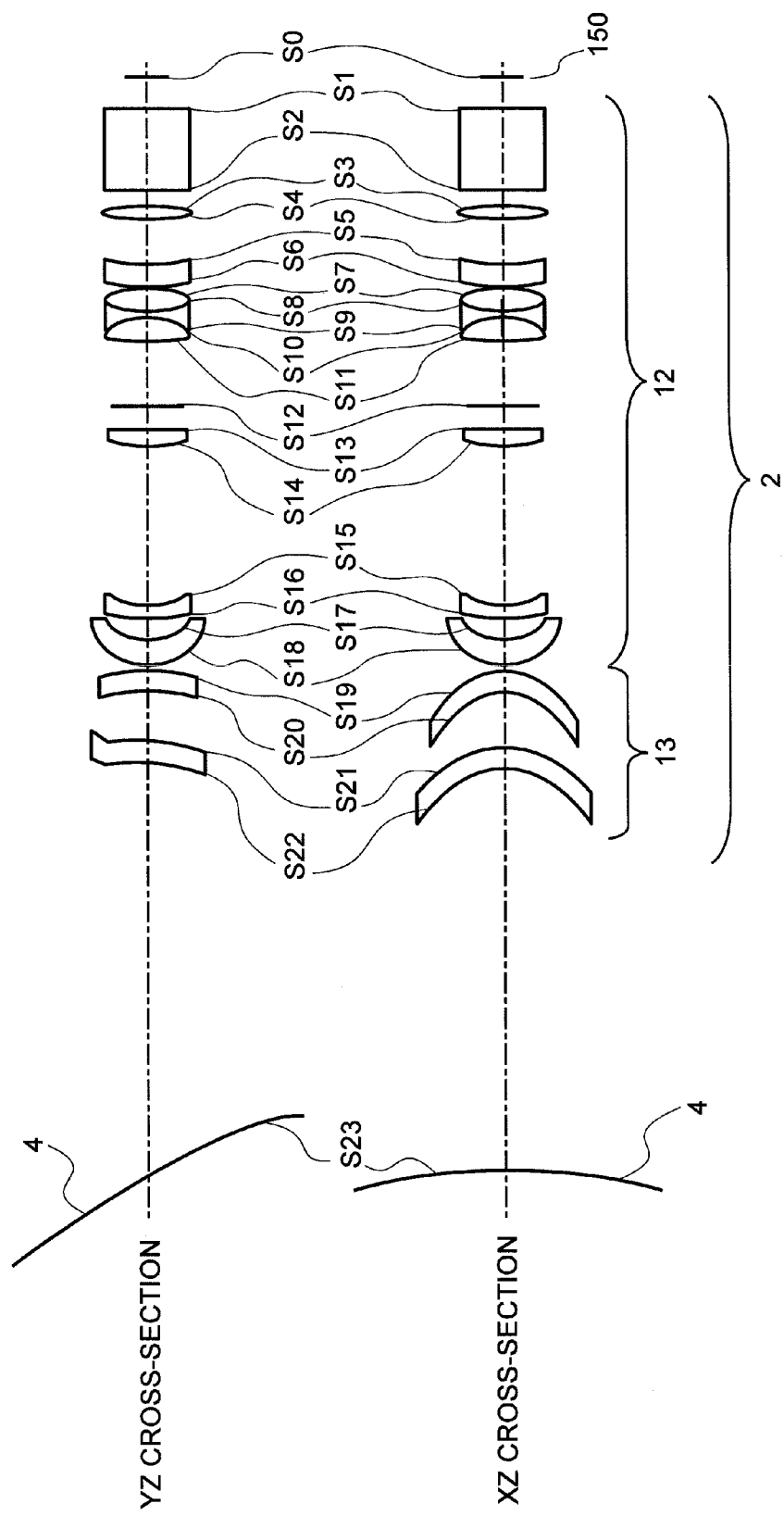
FIG. 4 is a cross-section view of the projection lenses.

FIG. 2 is a cress-section view for showing the structures of a basis or fundamental optic system of the projection device within the image display apparatus, wherein the structures of the optic system are shown on a YZ cross-section within XYX orthogonal coordinate systems. Herein, it is assumed that the origin or start point of the XYX orthogonal coordinate systems is at a is center of the display screen of the liquid crystal panel 150, and the Z-axis thereof is in parallel with a normal line 8 of the image display liquid crystal panel 170. And, it is also assumed that the Y-axis thereof is in parallel with a short side of the display screen of the image display liquid crystal panel 170, and that it is equal to the image display liquid crystal panel 170 in the vertical direction thereof. Further, it is assumed that the X-axis thereof is in parallel with a longitudinal side of the display screen of the image display liquid crystal panel 170, and that it is equal to the image display liquid crystal panel 170 in the horizontal direction thereof. Also. FIG. 3 is a perspective view of projection lenses building up the projection device, and FIG. 4 is a cress-section view of the projection lenses, but omitting the illustration of bending of the optical path therein. However, FIG. 2 omits to shown the Fresnel lens sheet 160 therein, as the optical direction conversion part, for the purpose of simplifying the illustration.

As is shown in FIG. 2, the projection unit 10 includes projection lenses 2, a freely curved surface mirror 4 as a first reflection mirror, and a plane reflection mirror 5 as a second reflection mirror, which are disposed or aligned on an optical path, directing from the liquid crystal panel 150 toward the Fresnel lens sheet 160 and the image display liquid crystal panel 170, sequentially from the liquid crystal panel 150.

The light modulation image upon the display screen of the liquid crystal panel 150 is projected toward the image display liquid crystal panel 170, by means of the projection lenses 2. In this instance, if projecting it, straightly, there is a necessity of a predetermined distance, and this elongates the depth size of the image display apparatus. Thus, the depth of the image display apparatus comes to be thick. Then, the optical paths (i.e., the optical paths indicated by the light beams 21, 22 and 23), directing from the projection lenses 2 toward the image display liquid crystal panel 170, are bent upon the freely curved surface lens 4 and the plane reflection mirror 5, thereby reducing the depth of the image display apparatus to be small. Further, the light beam 21, emitting from a center of the screen of the liquid crystal panel 150 and directing to a center of the image display liquid crystal panel 170 (hereinafter, being called a "screen central light beam"), is non-vertical to the incident surface of the image display liquid crystal panel 170 (in general, such the projection is called an "oblique projection"), thereby reducing the depth of the image display apparatus.

The projection lenses 2, as apparent from FIGS. 2 and 4, are made up with a front group 12, including a plural number of refractive lenses, each having a rotationally symmetric surface configuration, and a rear group 13, including a lens, at least one of surfaces thereof having a freely curved surface configuration, being rotationally asymmetric (hereinafter, being called "freely curved surface lens").

In FIG. 2, since length of the projection lens 2 is long, then it seems that the position of the liquid crystal panel 150 is far from, to the direction of the normal line 8 of the image display liquid crystal panel 170, and that the depth becomes thick. However, herein, as is shown in FIG. 3, a mirror 14 for bending an optical path is positioned on the way of the front group 12 that is disposed in parallel with the X-axis (i.e., a longitudinal side of the image display liquid crystal panel), and thereby bending an optical axis 9 of the front group 12 (i.e., the optical axis of the projection lenses) into the direction of Z-axis (i.e., into the direction parallel with the normal line 8 of the image display liquid crystal panel), so as to prevent the depth thereof from being increased. Of course, the present invention should not be limited to this, and the mirror for bending the optical path may be also disposed between the freely curved surface mirror 4 and the rear group of the projection lenses 2, or between the front group 12 and the rear group 13 of the projection lenses 2.

In the present embodiment, as is shown in FIG. 2, the liquid crystal panel 150 is disposed, with locating the center of the display screen thereof on the optical axis 9 of the projection lenses 2. Accordingly, the screen central light beam 21 emitting from the center of the display screen of the liquid crystal panel 150, passing through an incident pupil of the projection lenses 2, and directing to the screen center of the image display liquid crystal panel 170, propagates along with the optical path of the projection lenses. This screen central light beam 21, after is being reflected at a point P2 upon the reflection surface of the freely curved surface mirror 4, is reflected at a point P5 on the plane reflection mirror 5, and it is incident at a point P8 upon the incident surface of the image display liquid crystal panel 170, by a predetermined angle (θs) with respect to the normal line 8 of the incident surface of that image display liquid crystal panel (i.e., obliquely).

This means that the light beam passing through, along with the optical axis 9 of the projection lenses 2, is incident, obliquely, with respect to the image display liquid crystal panel 170, and also means that the optical axis of the projection lenses 2 is substantially provided inclining to the image display liquid crystal panel 170. When making the light incident upon the image display liquid crystal panel, in this manner, then there are generated various kinds of aberrations, not being rotationally symmetric to the optical axis, other than the so-called trapezoidal distortion, i.e., bringing the rectangular shape projected into the trapezoidal one. Then, according to the present embodiment, those are compensated by means of the rear group 13 of the projection lenses 2 and also the reflection surface of the freely curved surface mirror 4.

Within the cross-section shown in FIG. 2, the light beam being emitted, passing through the center of the incident pupil of the projection lenses 2, from a lower end of the screen of the liquid crystal panel 150, and being incident at a point P9 upon an upper end of the screen of the image display liquid crystal panel 170, corresponding to this, it is assumed to be a light beam 22. Also, the light beam being emitted, passing through the center of the incident pupil of the projection lenses 2, from an upper end of the screen of the liquid crystal panel 150, and being incident at a point P7 upon a lower end on the screen of the image display liquid crystal panel 170, corresponding to this, it is assumed to be a light beam 23. When seeing FIG. 2, an optical path length starting from the point P3 via the point P6 and reaching to the point P9 is longer the optical path length starting from the point P1 via the point P4 and reaching to the point P7. This means that the image point P9 on the image display liquid crystal panel 170 is far from the image point P7, seeing them from the projection lenses 2. Then, if an object point corresponding to an image point on the image display liquid crystal panel 170 (i.e., a point on the display screen of the liquid crystal panel 150) is at a point nearer to the projection lenses 2, and also if an object point corresponding to the image point P7 is at the position farther from the projection lenses 2, it is possible to compensate the inclination of the image surface. For that purpose, a normal-line vector at the center of the display screen on the liquid crystal panel 150 is inclined with respect to the optical axis of the projection lenses 2. In more details, it is enough to incline the normal-line vector mentioned above into the direction where the image display liquid crystal panel 170 is located, within the YZ plane. The method is already known for inclining the object plane in order to obtain the object plane inclining with respect to the optical axis. However, with the practical angle of field, since the image surface upon inclination of the object plane generates deformation asymmetric with respect to the optical axis, and it is difficult to compensate it, by means of the projection lenses, being rotationally symmetric. Then, according to the present embodiment, the asymmetric deformation on the image surface is dealt with, by using the freely curved surface, being rotationally asymmetric, i.e., being rotationally asymmetric. For this reason, it is possible to reduce a low dimension distortion on the image surface, greatly, by inclining the object surface, and this is effective for assisting the compensation of aberrations.

Next, explanation will be given on a function of each of optical elements.

In the projection lenses 2, the front group 12 is made of the main lenses, for projecting the modulated light image on the display screen of the liquid crystal panel 150 onto the image display liquid crystal panel 170, and it compensates the fundamental or basic aberrations on the rotationally symmetric optic system. The rear group 13 of the projection lenses 2 includes the freely curved surface lens, being rotationally asymmetric. Herein, as is apparent from FIGS. 2, 3 and 4, the freely curved surface lens is curved, directing the concave portion thereof into the direction of emission of the light. And, curvature of the freely curved surface lens, in particular, of a portion where the light beam 23 passes through directing to the lower end of the image display liquid crystal panel 170, is larger than that of a portion where the light beam 22 passes through directing to the upper end of the image display liquid crystal panel 170.

The freely curved surface mirror 4 has a reflection surface of freely curved surface configuration, being rotationally asymmetric. Herein, the freely curved surface mirror 4 is made from a convex surface mirror, being rotationally asymmetric, where a portion thereof is curved, so as to direct the convex with respect to the direction of light reflection thereon. In more details, the curvature of a portion (P1) for reflecting the light directing below onto the image display liquid crystal panel 170 is larger than that of a portion (P3) for reflecting the light directing upper onto the image display liquid crystal panel 170. In other words, on the YZ cross-section of the freely curved surface mirror 4 (i.e., on the cross-section in the direction vertical to the screen of the image display liquid crystal panel 170), the size between P1 and P2 and the size between P3 to P2 are made different from, with respect to the position P2 where the screen center light beam 21 is reflected upon, so that the following equation can be established:

$$\text{size between } P1 \text{ and } P2 < \text{size between } P3 \text{ to } P2 \quad \text{(Eq. 2)}$$

And, it is also possible the portion (P1) for reflecting the light directing below onto the image display liquid crystal panel 170 has a configuration, being convex into the direction of reflection of that light, while the portion (P3) for reflecting the light directing upper onto the image display liquid crystal panel 170 has a configuration, being concave into the direction of reflection of that light.

The aberration generated due to the oblique incidence is compensated, mainly, with the functions of the freely curved surface lens and the freely curved surface mirror, which are mentioned above. Thus, according to the present embodiment, the freely curved surface mirror 4 mainly compensates the trapezoidal distortion, and the rear group of the projection lenses 2 mainly compensates the asymmetric aberration, such as, the distortion on the image surface, etc.

In this manner, according to the present embodiment, the projection lenses include therein, at least one (1) piece of the freely curved surface lens, being rotationally asymmetric, and the freely curved surface mirror 4 defines the reflection mirror of freely curved surface configuration, being rotationally asymmetric. This enables to compensate both the trapezoidal distortion and the aberration, which are generated due to the oblique projection.

Next, explanation will be made on the optic system of the projection device, which was mentioned above, by referring to FIGS. 5 and 6 and Tables 1 to 4, as well, as showing the detailed numerical values thereof.

Figure 5:
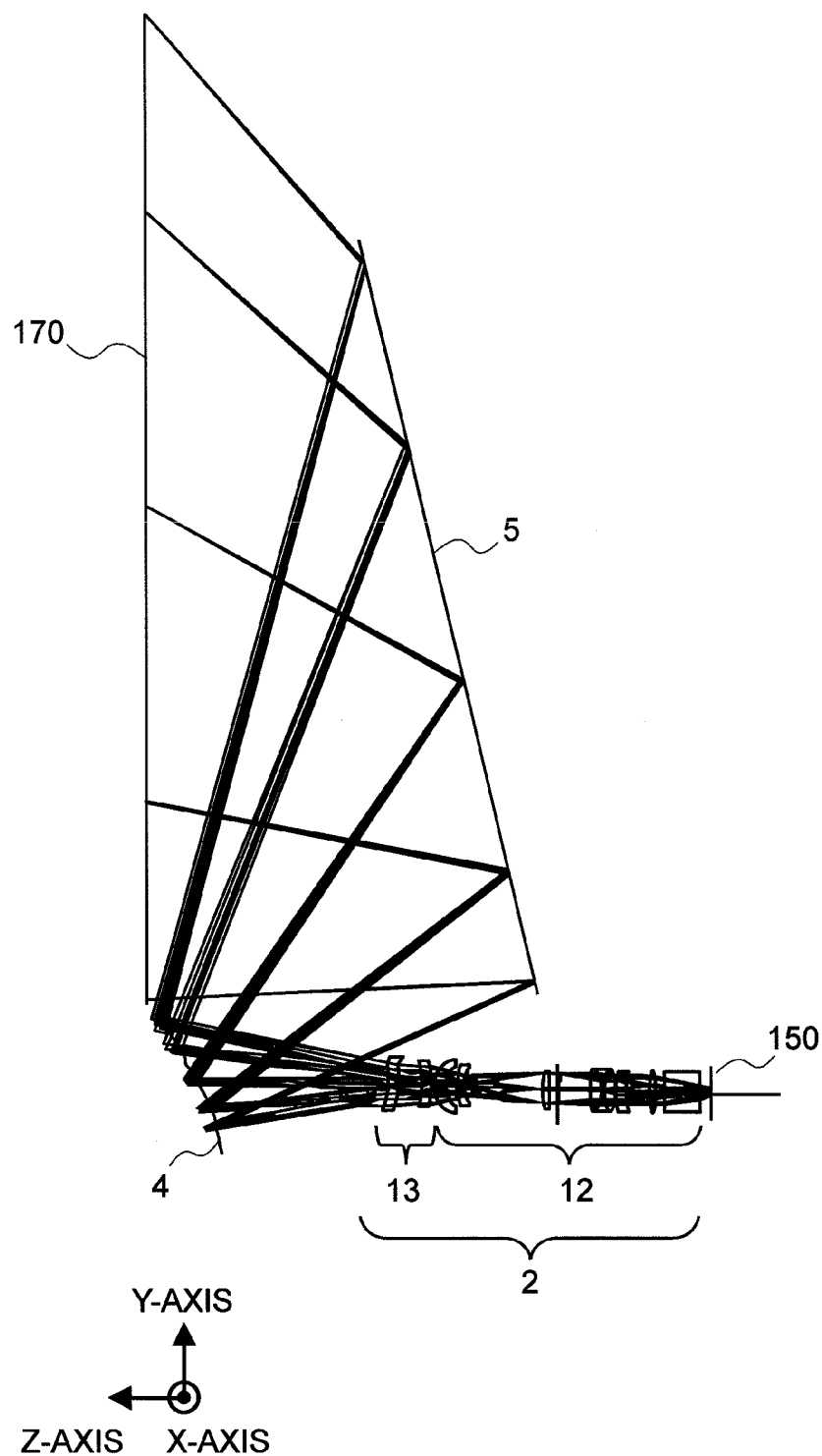
FIG. 5 is a view for showing the light beams of the projection optic system on YZ cross-section, according to the present embodiment.
Figure 6:
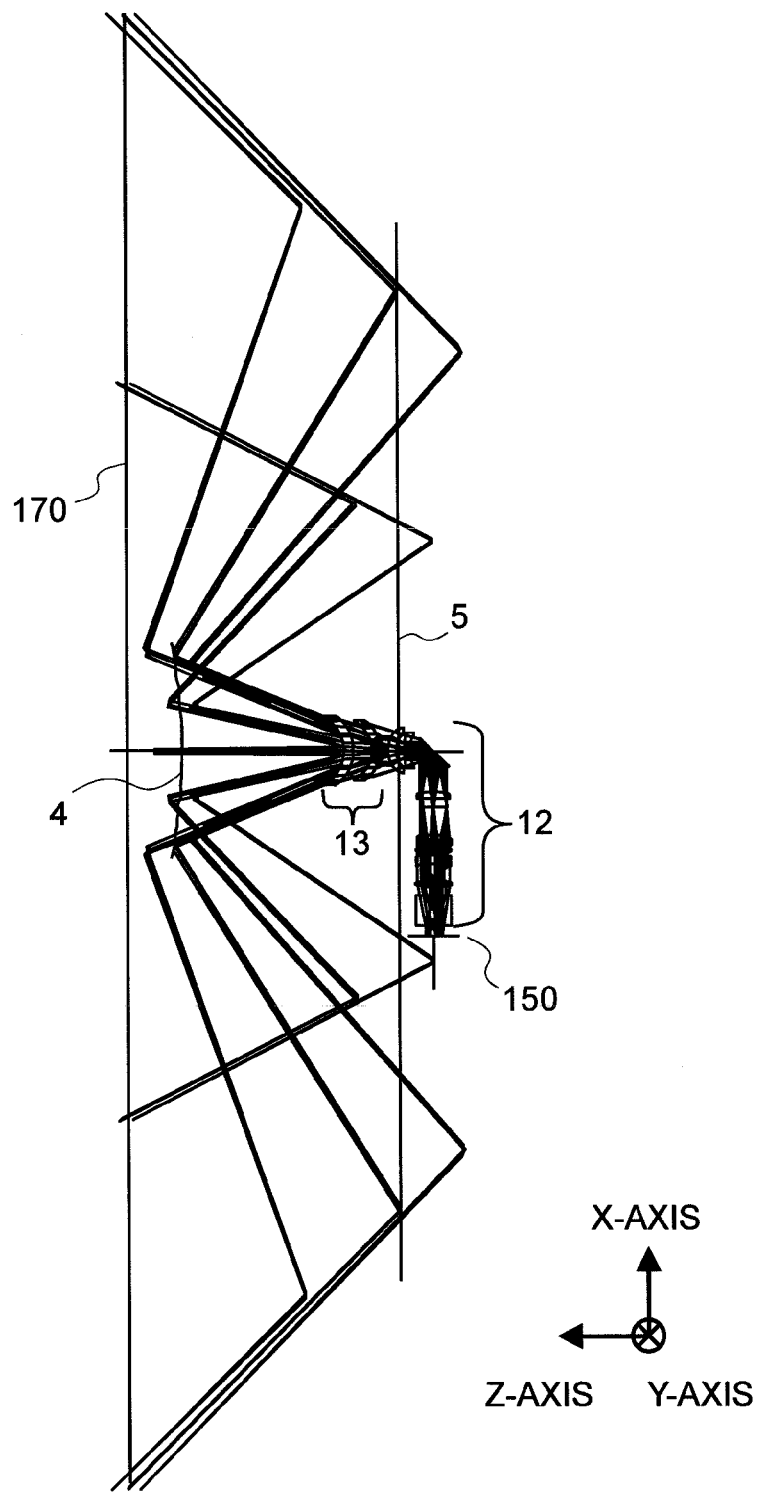
FIG. 6 is a view for showing the light beams of the projection optic system on XZ cross-section, according to the present embodiment.

FIGS. 5 and 6 show the diagram of light beams of the optic system of the projection device, according to the present embodiment, upon the numerical examples thereof. In the orthogonal XYZ coordinate systems mentioned above, FIG. 5 shows the structures thereof on the YZ cross-section, and FIG. 6 those on the XZ cross-section. Within the projection lenses 2, the optical path-bending mirror 14 is disposed on the way of the front group 12, as was mentioned in FIG. 3, but in FIG. 5 is omitted this optical path-bending mirror 14 from being shown therein, and the optic system is extended in the direction of Z-axis. This is also same in FIG. 4. The optical path-bending mirror has a little voluntariness in the position and/or the angle in setting thereof, and it gives no ill influence upon the function of each optical element. Therefore, explanation will be made, while omitting that of the optical path-bending mirror, in the explanation that will be given below.

The light emitting from the liquid crystal panel 150 shown below in FIG. 5 passes through, firstly the front group 12 that is constructed with only the lenses having the rotationally symmetric configuration, among the projection lenses 2 including the plural number of lenses therein. And, it passes through the rear group 13 including the freely curved surface lens therein, and is reflected upon the reflection surface of the freely curved surface mirror 4. The reflection light thereupon, after being reflected upon the plane reflection mirror 5, is incident upon the image display liquid crystal panel 170.

Herein, the front group 12 is built up with the plural number of lenses, all of which have a refracting surface of rotationally symmetric configuration, and four (4) of the refracting surfaces of those lenses have aspheric surfaces, each being rotationally symmetric, and others have the spherical surfaces. The aspheric surface being rotationally symmetric, which is used therein, can be expressed by the following equation (Eq. 3), with using a local cylindrical coordinates system for each surface:

$$Z = \frac{cr^2}{1 + \sqrt{1 - (1+k)c^2 r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

Where, "r" is the distance from an optic axis, and "Z" represents an amount of sag. Also, "c" is the curvature at an apex, "k" a conical constant, "A" to "J" coefficients of a term of power of "r".

The free curved surfaces in the rear group 13 of the projection lenses 2 can be expressed by the following equation (Eq. 4), including polynomials of X and Y, with applying the local coordinates system (x, y, z) assuming the apex on each surface to be the origin.

$$Z = \frac{cr^2}{1 + \sqrt{1 - (1+k)c^2 r^2}} + \sum_m \sum_n (C(m, n) \cdot x^m \cdot y^n)$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m,n) the coefficients of the polynomials.

The Table 1 shows the numerical data of the optic system, according to the embodiment 1. In this Table 1, S0 to S23 correspond to the marks S0 to S23 shown in FIG. 4 mentioned above, respectively. Herein, the mark S0 shows the display surface of the image display element 150, i.e., the object surface, and S23 the reflection surface of the freely curved surface mirror 4. Also, though not shown in FIG. 4, but a mark S24 shows an incident surface of the image display liquid crystal panel 170, i.e., the image surface. However, in FIG. 4, an upper view shows the YZ cross-section of the projection lenses 2 and the freely curved surface mirror 4, according to the present embodiment, and a lower view the XZ cross-section of that optic system.

In the Table 1 mentioned above, "Rd" is the radius of curvature for each surface, and it is presented by a positive value in case when having a center of curvature on the left-hand side of the surface in FIG. 5, while by a negative value in case when having it on the right-hand side, contrary to the above. Also, "TH" is the distance between the surfaces, i.e., presenting the distance from the apex of the lens surface to the apex of the next lens surface. The distance between the surfaces is presented by a positive value in case when the next lens surface is at the left-hand side, in FIG. 5, while by a negative value in case when it is at the right-hand side, with respect to that lens surface. Further, in the Table 1, S5, S6, S17 and S18 are aspheric surfaces, being rotationally symmetric, and also in this Table 1, they are attached with "*" beside the surface numbers for easy understanding thereof, wherein coefficients of the aspheric surface of those four (4) surfaces are shown in the Table 2 below.

S19 to S22 in the Table 1 are the refraction surfaces, each having the free curved surface configuration, which builds up the rear lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the Table 3 below.

According to the present embodiment, the object surface, i.e., the display screen of the image display element 11 is inclined by –1.163 degrees to the optical axis of the projection lenses 2. The direction of inclination, it is assumed, be presented by a positive value, into which the normal line on the object surface rotates into the clockwise direction, within the cross-section shown in FIG. 5. Accordingly, according to the present embodiment, it means that, within the cross-section shown in FIG. 5, the object surface is inclined into the anti-clockwise direction by 1.163 degrees from the position, perpendicular to the optical axis of the lens optic system.

The free curved surface mirror 4 of the mark S23 is so disposed that the origin of that local coordinates locates on the optical axis of the projection lenses 2. And, the normal line at the origin of that local coordinates, i.e., the Z-axis, is disposed, inclining by around +29 degree from the position parallel to the optical axis of the projection lenses 2. The direction of this inclination is assumed to be positive in the anti-clockwise rotating direction, within the cross-sections shown in FIG. 5, and therefore, it is inclined into the anti-clockwise rotation. With this, the screen central light beam, emitting from the screen center of the liquid crystal panel 150 and propagating almost along with the optical axis of the projection lenses 2, after being reflected upon S23, propagates into a direction inclined by 58 degrees, i.e., 2 times large as the inclination angle with respect to the optical axis of the projection lenses 2. Herein, it is assumed that a new optical axis after the reflection directs into the direction passing through S23, i.e., the origin of the coordinates, and inclining 2 times large as the inclination angle with respect to the optical axis of the projection lenses 2, and that the surfaces thereafter are disposed on this optical axis. The value −400 of the distance shown by S23 in the Table 1 indicates that the following S24 lies at the right-hand side of S23, and the origin of the local coordinates is located at the point of distance 400 mm along the optical axis after the reflection. The surfaces thereafter are also disposed in accordance with the same rules.

The conditions of the inclination and an offsets in the local coordinates are shown in the Table 4 below, for each surface. In this Table 4, values of the inclination angle and the offset are shown on the columns on the right-hand sides of the surface number, wherein "ADE" is a magnitude of the inclination within the surface in parallel with the cross-section shown in FIG. 5, and a rule of display thereof is as shown in the above. Also, "YDE" is a magnitude of the offset, and the offset is set up into the direction perpendicular to the optical axis within the surface in parallel with the cross-section of FIG. 5, and the offset below on the cross-section of FIG. 5 is assumed to be positive. However, in the present embodiment, "YDE" is set to be "0" (i.e., no offset).

In the present invention, the inclinations and the offsets of all optical elements are determined in the directions within the cross-section parallel with the cross-section shown in the figure.

From the Tables 1 and 3 mentioned above, according to the present embodiment, it is apparent that the curvature "c" and the conic coefficients "k" are "0". The trapezoidal distortion due to the oblique incidence is generated, extremely large in the direction of the oblique incidence, but the amount thereof is small in the direction perpendicular to this. Accordingly, in the direction of the oblique incidence and the direction perpendicular thereto, there must be provided functions greatly different from each other, and it is possible to compensate or correct the asymmetric aberration, preferably, without using the curvature "c" or the conic coefficient "k", being rotationally symmetric and functioning in all directions.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17* | −27.332 | 10.00 | 1.49245 | 42.9 |
| S18* | −32.424 | 2.50 | | |
| S19# | Infinity | 8.00 | 1.49245 | 42.9 |
| S20# | Infinity | 20.51 | | |
| S21# | Infinity | 8.00 | 1.49245 | 42.9 |
| S22# | Infinity | 160.99 | | |
| S23# | Infinity | −400.00 | REFL | |
| S24 | Infinity | 305.00 | REFL | |
| S25 | Infinity | — | | |

TABLE 2

| Surface | | | | Aspheric Surface Coefficients | | | | |
|---|---|---|---|---|---|---|---|---|
| S5 | K | −11.7678542 | C | −1.159E−11 | F | 2.298642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.106429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

TABLE 3

| Surface | | | Aspheric Surface Coefficients | | | | | |
|---|---|---|---|---|---|---|---|---|
| S19 | | | C17 | 5.38933E−07 | C34 | −1.2381E−09 | C51 | −7.4126E−14 |
| | K | 0 | C19 | 8.33432E−07 | C36 | 1.13944E−09 | C53 | 2.05074E−12 |
| | C4 | 0.013500584 | C21 | −4.6367E−08 | C37 | 3.87771E−12 | C55 | −9.2166E−13 |
| | C6 | 0.003493312 | C22 | −6.2643E−09 | C39 | 1.04779E−11 | C56 | −2.5867E−15 |
| | C8 | −0.00083921 | C24 | −2.2449E−08 | C41 | 1.80038E−11 | C58 | −8.7122E−15 |
| | C10 | −0.00032098 | C26 | −5.6706E−08 | C43 | 5.23019E−11 | C60 | 2.85321E−14 |
| | C11 | 8.59459E−06 | C28 | 9.69952E−10 | C45 | 1.69253E−11 | C62 | −8.5084E−14 |
| | C13 | 2.14814E−06 | C30 | −1.1968E−10 | C47 | −2.7E−14 | C64 | 1.25198E−13 |
| | C15 | 7.54355E−06 | C32 | −1.3638E−09 | C49 | 7.30978E−13 | C66 | −5.6277E−14 |
| S20 | | | C17 | 7.49262E−07 | C34 | −5.7462E−10 | C51 | −3.6141E−13 |
| | K | 0 | C19 | 1.19039E−06 | C36 | 1.27396E−09 | C53 | 8.54188E−14 |
| | C4 | 0.015488689 | C21 | −1.2953E−07 | C37 | −4.7746E−12 | C55 | −5.3469E−13 |
| | C6 | 0.006553414 | C22 | 5.115E−10 | C39 | 7.32855E−12 | C56 | 8.92545E−17 |

TABLE 3-continued

| Surface | | | | Aspheric Surface Coefficients | | | |
|---|---|---|---|---|---|---|---|
| | C8 | −0.00116756 | C24 | −2.1936E−08 | C41 | 5.30157E−11 | C58 | −5.3434E−15 |
| | C10 | −0.00033579 | C26 | −5.9543E−08 | C43 | 5.05014E−11 | C60 | 1.96533E−14 |
| | C11 | 7.5015E−06 | C28 | 2.03972E−08 | C45 | −2.1894E−11 | C62 | −1.3923E−13 |
| | C13 | −2.5728E−06 | C30 | 1.16701E−11 | C47 | −1.2515E−13 | C64 | 1.06322E−13 |
| | C15 | −1.3543E−06 | C32 | −1.6198E−09 | C49 | 7.64489E−13 | C66 | −4.6602E−15 |
| S21 | | | C17 | −1.0379E−07 | C34 | 2.81743E−10 | C51 | −8.1775E−15 |
| | K | 0 | C19 | 3.0082E−08 | C36 | 6.05663E−10 | C53 | 3.06022E−14 |
| | C4 | 0.015096874 | C21 | 7.95521E−08 | C37 | 8.39381E−13 | C55 | −9.1775E−13 |
| | C6 | 0.009982808 | C22 | −1.3911E−09 | C39 | 1.98531E−12 | C56 | −7.8543E−17 |
| | C8 | 0.000358347 | C24 | 9.33292E−10 | C41 | 1.37477E−11 | C58 | −8.9588E−16 |
| | C10 | 0.000209267 | C26 | 3.54468E−09 | C43 | −1.0671E−11 | C60 | −6.0768E−15 |
| | C11 | −3.8593E−07 | C28 | 4.1615E−09 | C45 | 9.04109E−12 | C62 | −1.9528E−14 |
| | C13 | −6.8336E−06 | C30 | −1.2331E−11 | C47 | 2.48401E−14 | C64 | 2.6781E−14 |
| | C15 | −2.2455E−05 | C32 | −2.3367E−10 | C49 | 6.92603E−14 | C66 | −1.4324E−14 |
| S22 | | | C17 | −3.6973E−07 | C34 | 4.8045E−10 | C51 | −2.9795E−13 |
| | K | 0 | C19 | −3.0682E−07 | C36 | 1.43328E−10 | C53 | −2.5306E−14 |
| | C4 | 0.022813527 | C21 | 4.12093E−08 | C37 | −2.0707E−12 | C55 | −3.9401E−13 |
| | C6 | 0.012060543 | C22 | 4.07969E−09 | C39 | −4.9221E−12 | C56 | 6.88651E−16 |
| | C8 | 0.000638931 | C24 | 8.5986E−09 | C41 | −2.3681E−12 | C58 | 1.55006E−15 |
| | C10 | 0.000196027 | C26 | 2.1713E−08 | C43 | −2.1567E−11 | C60 | −1.4674E−15 |
| | C11 | −7.1204E−06 | C28 | 1.63499E−08 | C45 | −2.3679E−12 | C62 | −9.9822E−15 |
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |
| S23 | | | C17 | −1.1083E−09 | C34 | −4.9118E−14 | C51 | −5.4918E−19 |
| | K | 0 | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

TABLE 4

| Surface | ADE (°) | YDE (mm) |
|---|---|---|
| S0 | −1.163 | 0.0 |
| S23 | 29.000 | 0.0 |
| S24 | −43.000 | 0.0 |
| S25 | 30.000 | 0.0 |

The numeral values of the above Tables 1 to 4 are those in an example of case when projecting the optical image (i.e., the modulated light image, upon which the light modulation is made within the region 16×9 on the screen of the liquid crystal panel 150, enlargedly, up to the size 1452.8×817.2 on the screen of the image display liquid crystal panel 170.

Figure 7:
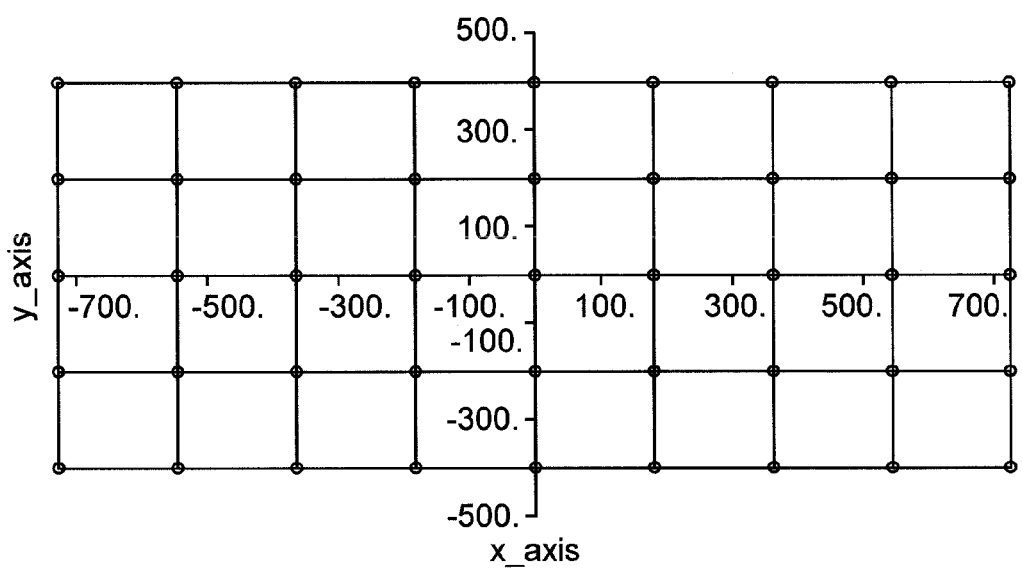
FIG. 7 is a view for showing distortion performances of the projection optic system, according to the present embodiment.

The distortion of that instance is shown in FIG. 7. The vertical direction in this FIG. 7 corresponds to the vertical direction shown in FIG. 5, and also corresponds to the direction of Y-axis thereof. The horizontal direction in FIG. 7 corresponds to the direction perpendicular to the Y-axis on the image display liquid crystal panel 170, and the center of an oblong in the figure corresponds to the center of the screen. This figure shows the condition of curvature of each of straight lines, in particular, when displaying the screen while dividing it into four (4) in the vertical direction and eight (8) in the horizontal direction, thereby to show the state or condition of graphic distortion.

Figure 8:
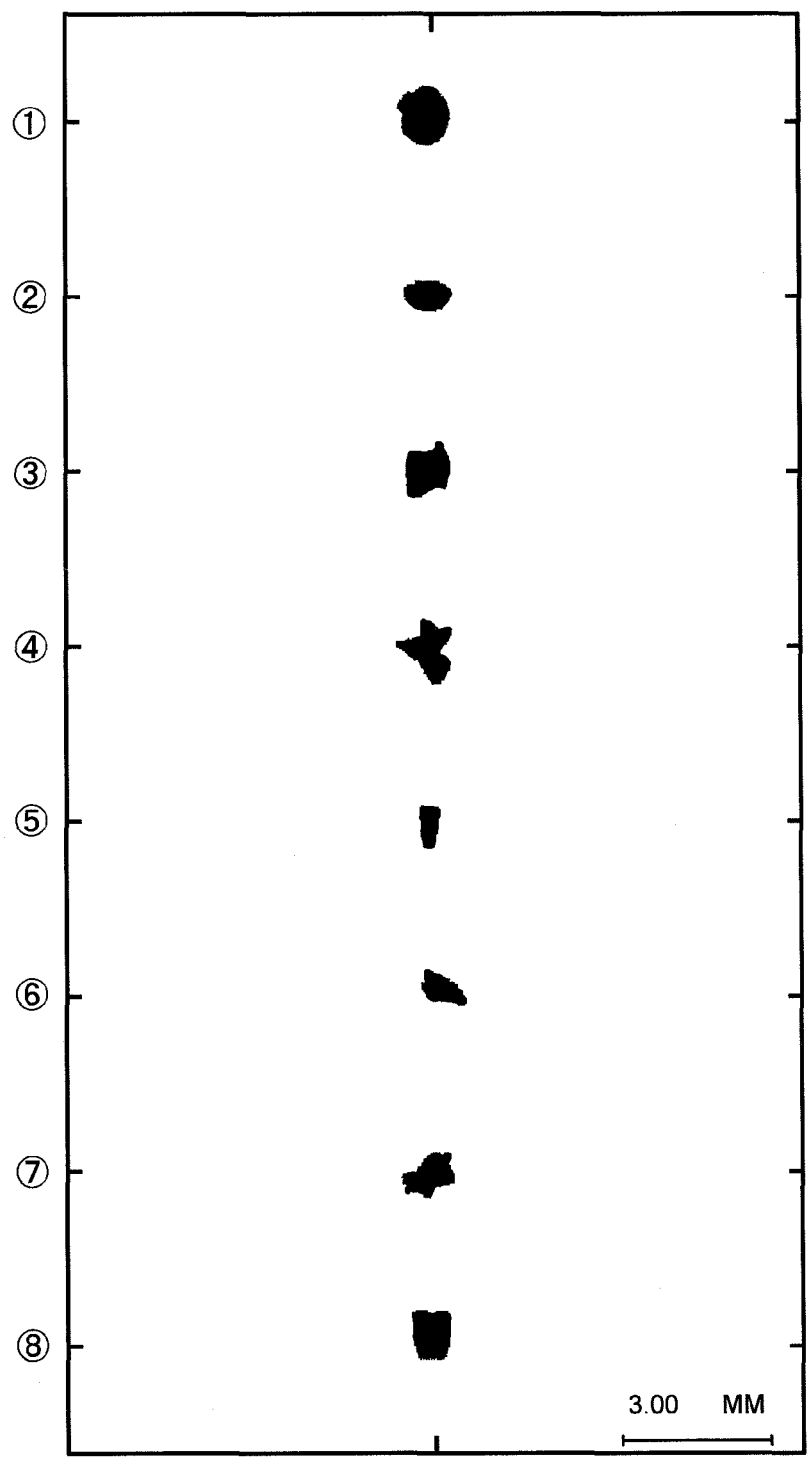
FIG. 8 is a view for showing spot performances of the projection optic system, according to the present embodiment.

Spot diagrams of the present numeric value embodiment are shown in FIG. 8. In this FIG. 8 are shown the spot diagrams of the light fluxes, emitting from eight (8) points on the display screen of the liquid crystal panel 150; i.e., (8, 4.5), (0, 4.5), (4.8, 2.7), (8, 0), (0, 0), (4.8, −2.7), (8, −4.5) and (0, −4.5) with the values of the X and Y coordinates, in the sequential order from the top (i.e., (1) to (8)). However, the unit thereof is "mm". The horizontal direction of each spot diagram corresponds to the X direction on the screen, while the vertical direction the Y direction on the screen. Both show that they maintain preferable performances.

In the above, mentioning is made on one example of the projection device. Further in the above, the light beam emitting from the projection lenses 2 is reflected upon the freely curved surface 4 and further upon the plane reflection mirror 5 to be turned back to the image display liquid crystal panel 170, in the structured thereof, but the present invention should not be restricted only to this, and it is needless to say that the plane reflection mirror for returning mentioned above may be omitted, depending upon the position of disposing the projection lenses.

Next, explanation will be made on one embodiment of the Fresnel lens sheet, functioning as the light direction conversion unit.

Figure 9A:
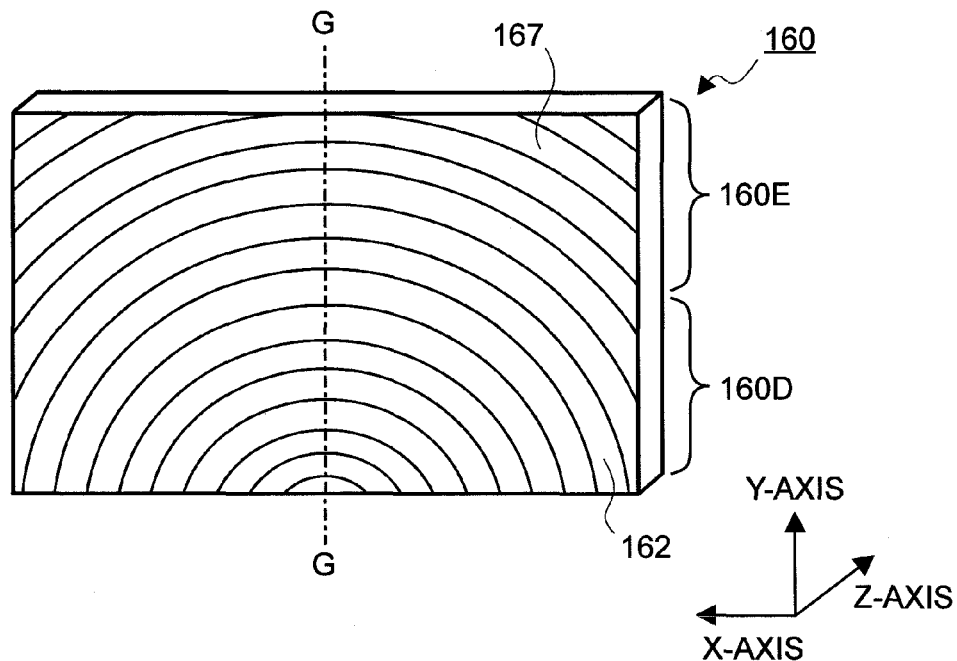
FIG. 9 is a view for diagrammatically showing a Fresnel lens sheet, according to the present embodiment.
Figure 9B:
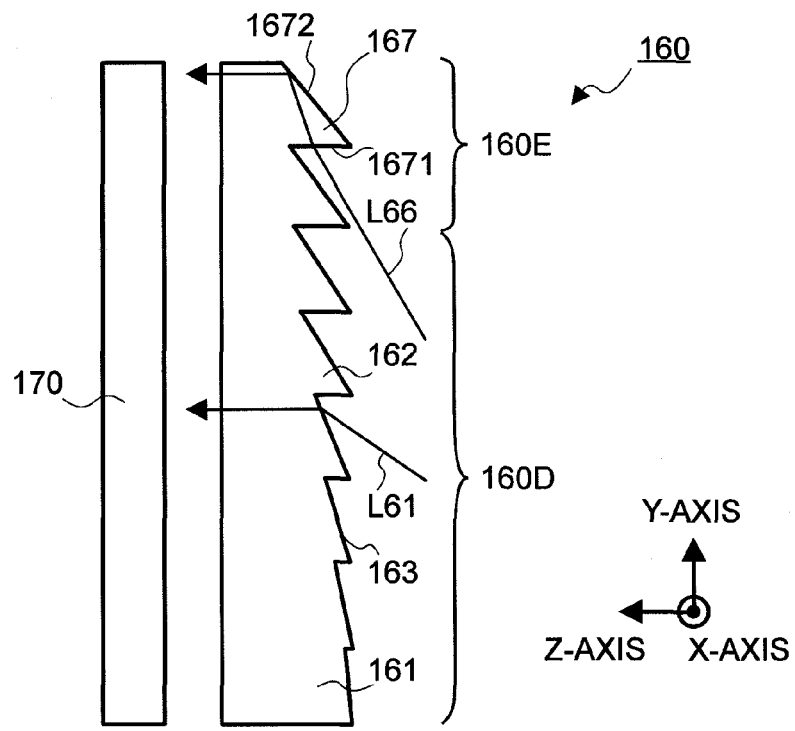

FIGS. 9(a) and 9(b) are views for showing the structures of the Fresnel lens sheet, diagrammatically, and in particular, FIG. 9(a) shows the perspective view when seeing the Fresnel lens sheet from the side of the projection device, and FIG. 9(b) the cross-section structure view thereof, cutting along a G-G line.

As shown in FIGS. 9(a) and 9(b), the Fresnel lens sheet 160 is constructed with a refraction region 160D, being located approximately corresponding to be the central side on the screen of the image display liquid crystal panel 170, and a total reflection region 160E, being located corresponding to the periphery side of the image display liquid crystal panel 170 and disposed so as to surround that refraction region 160D. Within the refraction region 160D are formed a plural number of refraction type Fresnel lenses 162, concentrically, upon the surface of a material 161 on the opposite side to that of the image display liquid crystal panel 170. Each of the Fresnel lenses 162 has a function of refracting the light beam L61, being projected from the projection device 10 and incident upon at an angle equal or less than a predetermined value thereof, thereby to be emitted onto the image display liquid crystal panel 170, vertically. Also, within the total reflection region 160E are formed a plural number of total reflection type Fresnel lenses, concentrically, upon the surface of the material 161 on the opposite side to that of the image display liquid crystal panel 170. Each of the total reflection Fresnel lenses 167 has a function for totally reflecting the light beam L66, being projected from the projection device 10 at the incident angle greater than the predetermined value, thereby to be emitted onto the image display liquid crystal panel 170, vertically.

As is well known, if constructing the Fresnel lens sheet from the refraction type Fresnel lenses, since the incident angle incident upon the Fresnel lens sheet (i.e., the angle defined between the normal line) comes to be large, as well as, since reflection can be easily generated upon the incident surface of the Fresnel lens, then the reflection loss increases, greatly, and therefore, it is dark on the peripheral portion of the screen. Then, according to the present embodiment, applying the technology shown in WO 2004/049059 therein, on the peripheral portion of the image display liquid crystal panel 170 are disposed the total reflection type prism, within a region where the incident angle from the projection device 10 is equal or greater than a predetermined value.

First of all, explanation will be given on the refraction type Fresnel lens 162 within the refraction region 160D.

With connecting the prism surface 163 of each of the refraction type Fresnel lenses, on an arbitrary cross-section of the refraction regions 160D of the Fresnel lens 160, it is possible to obtain one (1) piece of a curved line (i.e., an envelope line). Assembling all the obtained envelope lines on the cross-section thereof defines one (1) piece of an imaginary surface. Hereinafter, this imaginary surface is called an "original surface".

The original surface accompanying with the refraction type Fresnel lenses constructing the refraction region 160D is a spherical surface, in general, within the projection type image display apparatus, but according to the present embodiment, it has an aspheric surface configuration corresponding to the incident angle of the light beam, which is incident from the projection device 10 upon the image display liquid crystal panel 170, with applying the technology of the Fresnel lenses disclosed in Japanese Patent Laying-Open No. 2006-154719 (2006) therein.

In this instance, Fresnel angle in an upper portion is larger than that in a lower portion, on each prism surface, within the refraction region 160D. With this, the light beam incident upon the incident surface within the refraction region 160D of the Fresnel lens sheet 160 is converted so as to be incident upon the incident surface of the image display liquid crystal panel 170, almost perpendicular thereto, covering all over the surfaces of the image display liquid crystal panel 170.

Figure 10:
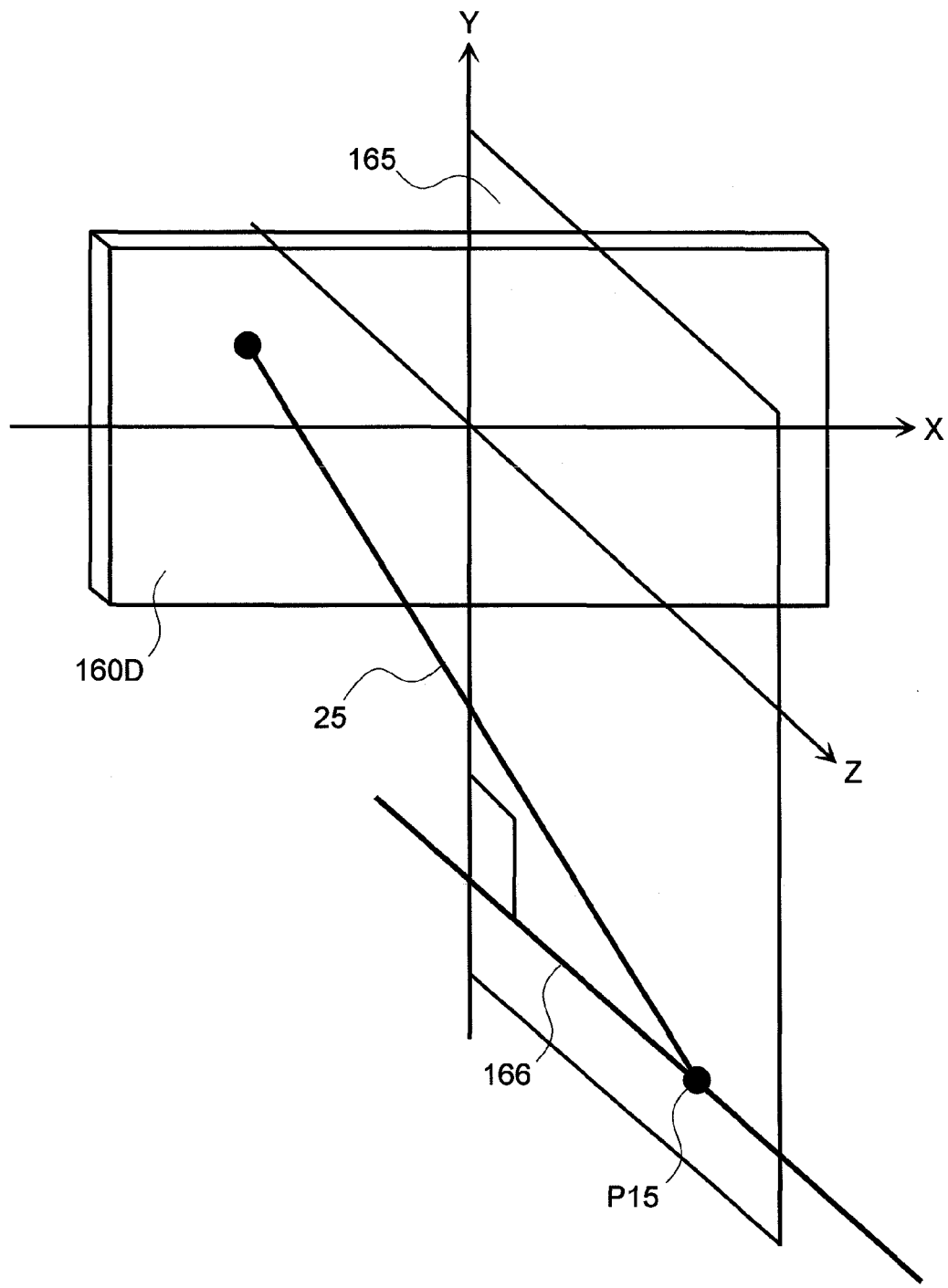
FIG. 10 is a view for explaining a method for determining a prism surface configuration, which made up a refraction-type Fresnel lens within a refraction region 160D.

Next, explanation will be made on the details of the method for determining the surface configuration of the plural number of prism surfaces 163 (i.e., the original surfaces of the Fresnel lenses), which is formed concentrically, on the refraction type Fresnel lenses 162 to be built up within the refraction region 160D mentioned above, by referring to the diagrammatic view shown in FIG. 10. However, as was mentioned above, the prism surfaces of the refraction type Fresnel lenses building up the refraction region 160D are formed, concentrically, surrounding a certain one (1) point (i.e., a rotation axis). And, the original surface for determining the Fresnel angle of the prism surface for each of the refraction type Fresnel lenses (i.e., an angle defined between the prism surface and a main plane surface of the Fresnel lens sheet 160) has an aspheric configuration. Herein, as was mentioned above, the original surface is that for determining the Fresnel angle for each prism surface, and it indicates that lens surface obtained when building up an entire of the refraction region 160D of the Fresnel lens sheet 160, as one (1) piece of lens. Thus, when determining the Fresnel angle of the prism surface for the refraction type Fresnel lenses, firstly it is assumed that the entire of the refraction regions 160D on the Fresnel lens sheet 160 has a certain lens characteristic, and the surface configuration of that lens is determined to be the original surface. And, the configuration, corresponding to each point of the refraction region 160D on that original surface (for example, a tangential line on the original surface at each point corresponding thereto), is extended onto the surface of the refraction region 160D. With this, the Fresnel angle of the prism surface is determined at each point of the refraction region 160D. Accordingly, a curve obtained by connecting each prism surface depending on that Fresnel angle, within the entire of the refraction region 160D, i.e., an envelope including an aggregate of all prism surfaces within the entire of the refraction region 160D of the Fresnel lens sheet presents the original surface mentioned above. Thus, the direction of refracted light on the prism surface at each point of the refraction region 160D is determined depending upon the configuration of the original surface mentioned above, corresponding to each prism thereof. Further, the rotation axis mentioned above is assumed to be orthogonal to the main plane (the XY plane in FIG. 10) of the Fresnel lens sheet 160 (i.e., the plane including Z-axis). Also, this rotation axis includes a point P15, at which the light beam 25 incident upon the Fresnel lens sheet 160 intersects the plane 165 (i.e., the plane parallel to the YZ plane) dividing the Fresnel lens sheet 160, vertically, the left and the right, equally. Thus, the rotation axis is an axis, being perpendicular to the main plane of the Fresnel lens sheet 160 (i.e., being in parallel to the normal line 8 of the image display liquid crystal panel 170; thus, an axis 166 shown in FIG. 10.

However, in the above-mentioned, because the incident light beam 25 changes the incident angle (i.e., the angle to the normal line of the incident surface) depending on the position on the image display liquid crystal panel 170, therefore herein, there must be also a plural number of axes 166, which can be obtained from the above-mentioned. However, among of those plural number of axes, the axis at the almost center thereof is assumed to be the rotation axis of the refraction type Fresnel lens (i.e., the central position of the concentric-like prism building up the refraction type Fresnel lens).

Following to the above, the configuration (i.e., the angle) of the Fresnel angle is obtained, for each of the prism surfaces, as follows. First of all, there is obtained an angle of the prism, for emitting the light incident upon the image display liquid crystal panel 170 into the direction of the normal line mentioned above (i.e., 0 degree in an emission angle), while refracting it on the prism surface of the refraction region 160D, in accordance with the Snell's law, for each of the points on the refraction region 160D. Next, the original surface (aspheric surface) of the refraction type Fresnel lenses is made up with continuing the prism surfaces obtained.

However, this original surface obtained can be approximated by the equation of aspheric surface of the following (Eq. 5):

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14}$$

Herein, "Z" is an amount of sag, "r" the distance from the optic axis, "c" the curvature at an apex, "k" a conic constant (or, conical constant), "A" to "J" coefficients (the aspheric surface coefficients) of a term of power of "r".

In this instance, further, comparison is made between the aspheric coefficients approximated and an actual emission angle of the light beam, and necessary amendment and/or changing are added, appropriately, upon the position of the rotation axis and/or the aspheric surface coefficients, so as to bring the emission angle into almost 0 degree.

In this manner, portions of the refraction region 160D of the Fresnel lens sheet 160 are conducted with the elements obtained in the above, i.e., positions of the rotation axes, to be the rotation centers of the concentric prism portions building up the refraction type Fresnel lenses, and the aspheric coefficients of the original surface, which is formed by the aggregate of the respective prism surfaces.

Figure 11:
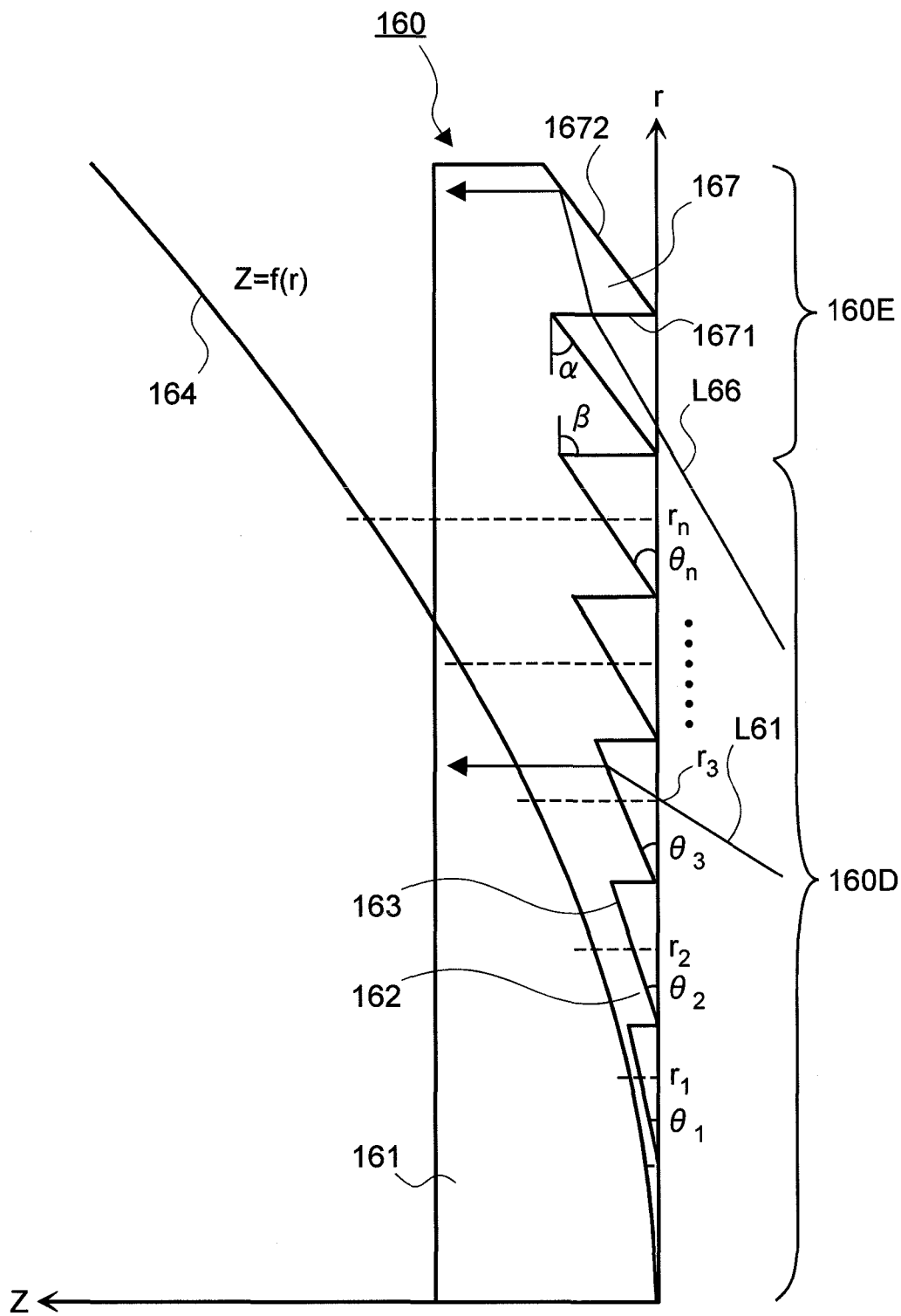
FIG. 11 is a view for showing the relationship between a prism surface and an original surface within the refraction region 160D.

FIG. 11 shows the diagrammatic cross-section of the Fresnel lens sheet 160, which is made up through the processes mentioned above. This FIG. 11 shows the cross-section view of the Fresnel lens sheet 160 cutting along a plane, being parallel to the normal line of that Fresnel lens sheet 160 and including the rotation axis mentioned above.

In FIG. 11, Z=f(r) is a polynomial expression for expressing the original surface of aspheric surface configuration accompanying with the refraction type Fresnel lenses, within the refraction region 160D of the Fresnel lens sheet 160, and it can be expressed by the equation (Eq. 5). Herein, "r" corresponds to "r" in (Eq. 5) mentioned above, and presents the distance from the rotation axis. The Fresnel angle "θ1" of the prism surface 163 of the reflection type Fresnel lenses at the distance "r1" (i.e., the angle defined between the main plane of the Fresnel lens sheet 160 and the prism surface) is nearly equal to an inclination (i.e., a tangent) of the original surface 164 at the distance "r1". Thus, assuming that the aspheric surface equation of the original surface expressed by the (Eq. 5) is Z=f(rn), and that "n" is an integer equal or greater than "1", then the Fresnel angle "θn" at each position on the refraction region 160D can be expressed by the following (Eq. 6)

$$\theta n = f(rn)'$$

Therefore, the following can be obtained, i.e., θ1=f(r1)', θ2=f(r2)', θ3=f(r3)'.... In this manner the Fresnel angle "θn" at each position of the refraction region 160D almost corresponds to a differential value at each position of the aspheric surface equation (i.e., each distance "rn"). In this manner, the Fresnel angle "θn" is determined at each position of the refraction region 160D within the Fresnel lens sheet 160.

As was mentioned above, the light beam incident from the projection device 10 upon the refraction region 160D of the Fresnel lens sheet 160 is refracted upon each prism surface 163 of the refraction type Fresnel lenses. As was mentioned above, if bringing the original surface 164 of the refraction type Fresnel lens into the aspheric surface configuration depending on the incident angle of the incident light beam upon each position of the refraction region 160D, then each light beam refracted upon each prism surface 163 is almost parallel to the normal line of the Fresnel lens sheet 160. Herein, as is apparent from FIG. 11, the Fresnel angle "θ" of the prism surface 163, locating at an upper potion of the refraction region 160D of the Fresnel lens sheet 160 (i.e., at a position on the image display liquid crystal panel, being in an upper portion in the vertical direction and being far from the rotation axis) is determined to be larger than the Fresnel angle "θ" of the prism surface 163, locating at a lower potion of the refraction region 160D of the Fresnel lens sheet 160 (i.e., at a position on the image display liquid crystal panel, being in a lower portion in the vertical direction and being near to the rotation axis). This is because, in the oblique projection according to the present embodiment, the incident angle of the light beam is larger, in the upper portion of the image display liquid crystal panel, than that in the lower portion of the image display liquid crystal panel.

Next, explanation will be given on the total reflection type Fresnel lenses 167 within the total reflection region 160E, by referring to FIG. 11.

As is shown in FIG. 11, each of the total reflection type Fresnel lenses within the total reflection region 160E includes a refraction surface 1671 and a total reflection surface 1672. The light beam L66 incident upon the total reflection type Fresnel lens 167 is refracted upon the refraction surface 1671 thereof, and directed toward the total reflection surface 1672. And, it is totally reflected upon the total reflection surface 1672, to be emitted from the Fresnel lens sheet 160, and thereby being incident upon the image display liquid crystal panel 170 perpendicular thereto.

For achieving to bring the incident light beam to emit onto the image display liquid crystal panel 170, perpendicularly, an angle "α", defined between the total reflection surface 1672 and the main plane, is so determined that it comes to be small, gradually, from the total reflection type Fresnel lenses near to the projection device 10 up to the total reflection type Fresnel lenses far from that, and an angle "β", defined between the refraction surface 1671 and the main plane, is so determined, on the contrary thereto, that it comes to be large, gradually, from the total reflection type Fresnel lenses near to the projection device 10 up to the total reflection type Fresnel lenses far from that. In this manner, it is possible to emit the light beam incident upon the total reflection region toward the image display liquid crystal panel 170, perpendicularly.

With such the structures of the Fresnel lens sheet as was mentioned above, it is possible to convert the light beam, being projected from the projection device 10 toward the image display liquid crystal panel 170, into that incident upon the image display liquid crystal panel 170 to have the incident angle of nearly 0 degree, so as to be emitted therefrom. Accordingly, with using the Fresnel lens sheet according to the present embodiment, since the light beam from the projection device 10 is incident upon the image display liquid crystal panel 170 in parallel to the normal line thereof (i.e., perpendicular to the image display liquid crystal panel 170), it is possible to display the image or picture of high contrast upon the image display liquid crystal panel 170.

Further, although the explanation was given that, both the refraction region and the total reflection region are provided on the incident side of the sheet, with the Fresnel lens sheet mentioned above, however the present should not be restricted only to this. For example, as is described in Japanese Patent Laying-Open No. 2005-91541 (2006), which was filed by the present inventors, it is also possible to provide the total reflection region on the peripheral portion where the incident angle is equal or greater than a predetermined value, on the incident side of the sheet, while providing the refraction region at a central portion where the incident angle is equal or less than the predetermined value, on the emission side of the sheet.

Embodiment 1

With the lighting apparatus shown in FIG. 1, since distribution of an amount of lights (or, distribution of light intensity or distribution of luminance) irradiated from the light source 110 upon the liquid crystal panel is not uniform (or, equalized), there is a possibility of generating unevenness in brightness of the image displayed on the image display liquid crystal panel. Then, explanation will be made on a lighting apparatus, according to the embodiment 1, in which an integrator is inserted between the light source and the liquid crystal panel, for informing the light amount distribution of the illumination light from the light source, by referring to FIG. 12.

Figure 12:
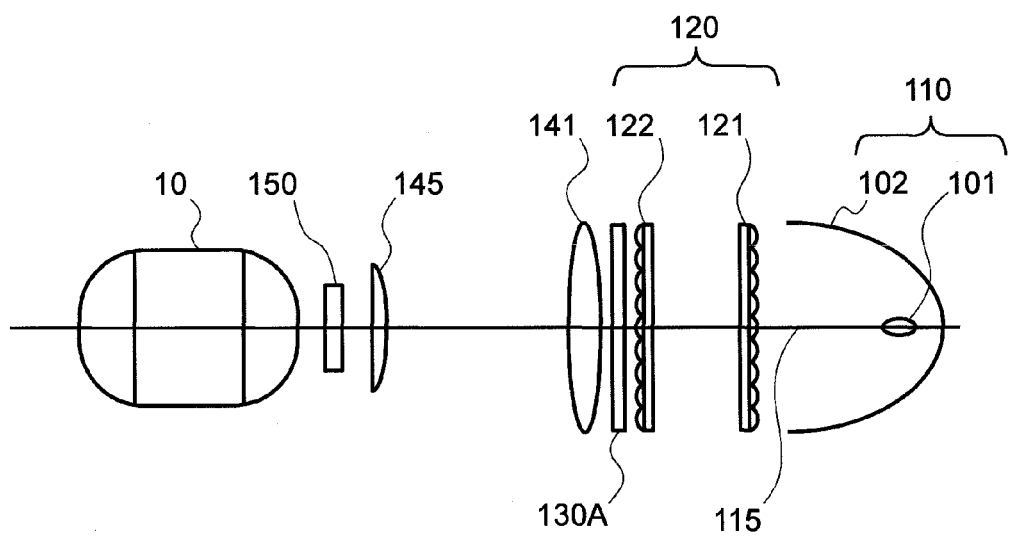
FIG. 12 is a view for diagrammatically showing a lighting apparatus, according to an embodiment 1.

FIG. 12 is the structure view of the lighting apparatus, according to the embodiment 1.

As is shown in FIG. 12, the lighting apparatus according to the present embodiment includes a light source 110, a first multi-lens element 121 and a second multi-lens element 122, functioning as a multi-lens type integrator 120 in a pair thereof, a polarized light conversion element 130A, a pileup lens 141, a field lens 145, a liquid crystal panel 150, a projection device 10, and a Fresnel lens sheet 160. However, in this FIG. 12, the Fresnel lens sheet 160 is omitted from illustration thereof, as the optic direction conversion device of building up an element of the lighting apparatus.

The light source 110 comprises a lamp 101 and a reflector 102. The lamp 101 is a while color lamp, such as, the high-pressure mercury lamp, for example. The reflector 102 has a reflection surface of rotationally parabolic configuration, for example, which is disposes so that it covers the lamp 101 from the rear side thereof, and it has an emission opening having a circular or polygonal shape.

A light emitted from the lamp 101 is reflected upon the reflector 102 having the rotationally parabolic configuration, to be almost parallel to an optical axis 115; i.e., an almost parallel light beam is emitted from the light source 110. The light emitted from the light source 110 is incident upon the integrator of the multi-lens type.

The multi-lens type integrator 120 is made up with the first multi-lens element 121 and the second multi-lens element 122.

The first multi-lens element 121, having a rectangular shape almost similar or analogous to the liquid crystal panel 150 and the image display liquid crystal panel 170 when seeing it into the direction of the optical axis 115 and being made up with a plural number of lens cells arranged in a matrix manner, divides the light incident thereupon from the light source into a plural number of lights through the plural number of the lens cells; i.e., guiding them to pass through the second multi-lens element 122 and the polarized light conversion element 130A, effectively. Thus, the first multi-lens element 121 is so designed that it is in an optically conjugated relationship with the lamp 101 and each of the lens elements of the second multi-lens element 122.

In the similar manner to that of the first multi-lens element 121, with the second multi-lens element 122, having a rectangular shape almost similar or analogous to the liquid crystal panel 150 and the image display liquid crystal panel 170 when seeing it into the direction of the optical axis 115 and being made up with a plural number of lens cells arranged in a matrix manner, each of the lens cells building up projects (or, mapping) the configuration of the lens cell of the first multi-lens element 1 corresponding thereto, upon the pileup lens 141 and the liquid crystal panel 150, respectively.

In this course or process, upon the polarized light conversion element 130A are aligned the lights from the second multi-lens element 122 into a predetermined polarization direction. And, the projection image of each of the lens cells of the first multi-lens element 121 is piled up thereon, respectively, by means of the pileup lens 141, and after being converted to be almost parallel with the optical axis 115 through the field lens 145, they are piled up on the liquid crystal panel 150.

However, since the second multi-lens element 122 and a condenser lens 141, which is disposed near to this, are so designed that they are optically in the relationship between a subject and an image (i.e., the conjugated relationship), with each of the lens cells of the first multi-lens element 121, then the light beams divided into a plural number thereof through the first multi-lens element 121 are projected upon the liquid crystal panel 150, by means of the second multi-lens element 122 and the pileup lens 141, piling up each other, and thereby brining the light amount distribution upon the liquid crystal panel 150 to be uniform.

Herein, explanation will be made about the function of polarized light conversion of the polarized light conversion element 130A, by referring to FIG. 13. This FIG. 13 is a view for showing the cross-section structures of the polarized light conversion element, cutting along the longitudinal side of the liquid crystal panel including the optical axis of the polarized light conversion element.

Figure 13:
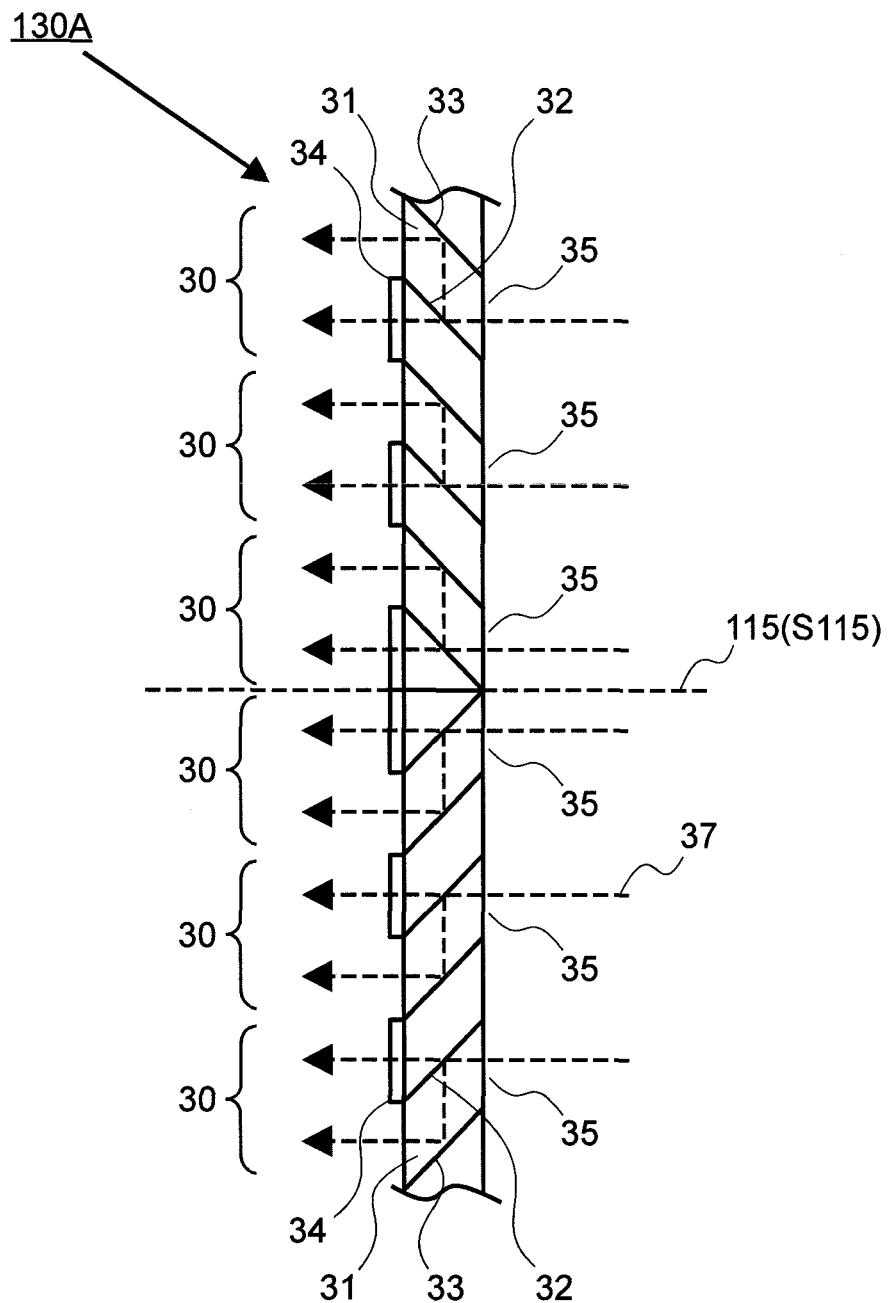
FIG. 13 is a view for showing the structures of a polarized light conversion unit, upon the cross-section cut along a longitudinal side of a liquid crystal panel including an optical axis thereof, according to an embodiment 1.

As is shown in FIG. 13, within the polarized light conversion element 130A, a plural number of translucent materials 31, each being a parallelogram column extending along the direction in parallel with the short side of the liquid crystal panel 150, are arranged in parallel with the longitudinal side of the liquid crystal panel 150, in the manner of an array, in parallel with the surface perpendicular to the direction of the optical axis 115, and on boundary surfaces defined between the translucent materials 31 neighboring to each other, which are disposed in the manner of the array, there are arranged a polarized light beam splitter films (hereinafter, being abbreviated "PBS film") 32 and a reflection film 33, alternately. Also, on the emission surface, from which the light emits, passing through an opening portion 35 on the incident side of the polarized light conversion element 130A and penetrating through the PBS film 32, there is provided a $\lambda/2$ phase difference plate 34. Also, the polarized light conversion element 130A is constructed to be symmetric with respect to a surface that is defined the optical axis 115 and an extending direction of the translucent material 51 of the parallelogram column (i.e., the plane including the optical axis 115, and conveniently, being called an "optical axis surface", hereinafter).

Upon the polarized light conversion element 130A constructed as was mentioned above, for example, S-polarized light, among the light beam 37 being incident upon the first multi-lens element 121, the second multi-lens element 122 and the opening portion 35, is reflected upon the PBS film 32, and is also reflected upon the reflection mirror 33, thereby being emitted as the S-polarized light therefrom. Also, the light of P-polarized light passes through the PBS film 32, and is converted into the S-polarized light through the $\lambda/2$ phase difference plate 34 provided on the emission surface, thereby being emitted therefrom. With providing such polarized light conversion units 30, as a basic element, in a plural number thereof, the polarization direction of the light incidence upon the polarized light conversion element 130A is aligned into the light in a predetermined polarization direction (herein, the light of S-polarization), thereby to be emitted therefrom. In case when aligning it into the P-polarized light, it is enough to provide the $\lambda/2$ phase difference plate 34 on the emission surface of the S-polarized light.

As was mentioned above, it is possible to irradiate the liquid crystal panel 150, uniformly or equally, by means of the multi-lens type integrator 120, which is constructed with a pair of the first multi-lens element 121 and the second multi-lens element 122.

Embodiment 2

In the embodiment 1 is used the multi-lens type integrator 120, which is made from the pair of the first multi-lens element 121 and the second multi-lens element 122, as the integrator for uniformizing (or equalizing) the illumination lights. Next, explanation will be made on the lighting apparatus, according to the embodiment 2, applying a rod-type integrator, as a kind of the integrator, by referring to FIG. 14.

However, as such the rod-type integrator may be applied a light funnel or a rod lens, etc., for example, but herein is applied the light funnel. Also, as the liquid crystal panel, the reflection-type liquid crystal panel is applied, herein. However, the present invention should not be restricted to this, but the rod lens may be applied in the place of the light funnel, and also may be applied a micro mirror or a transmission-type liquid crystal panel in the place of the reflection-type liquid crystal panel.

Figure 14:
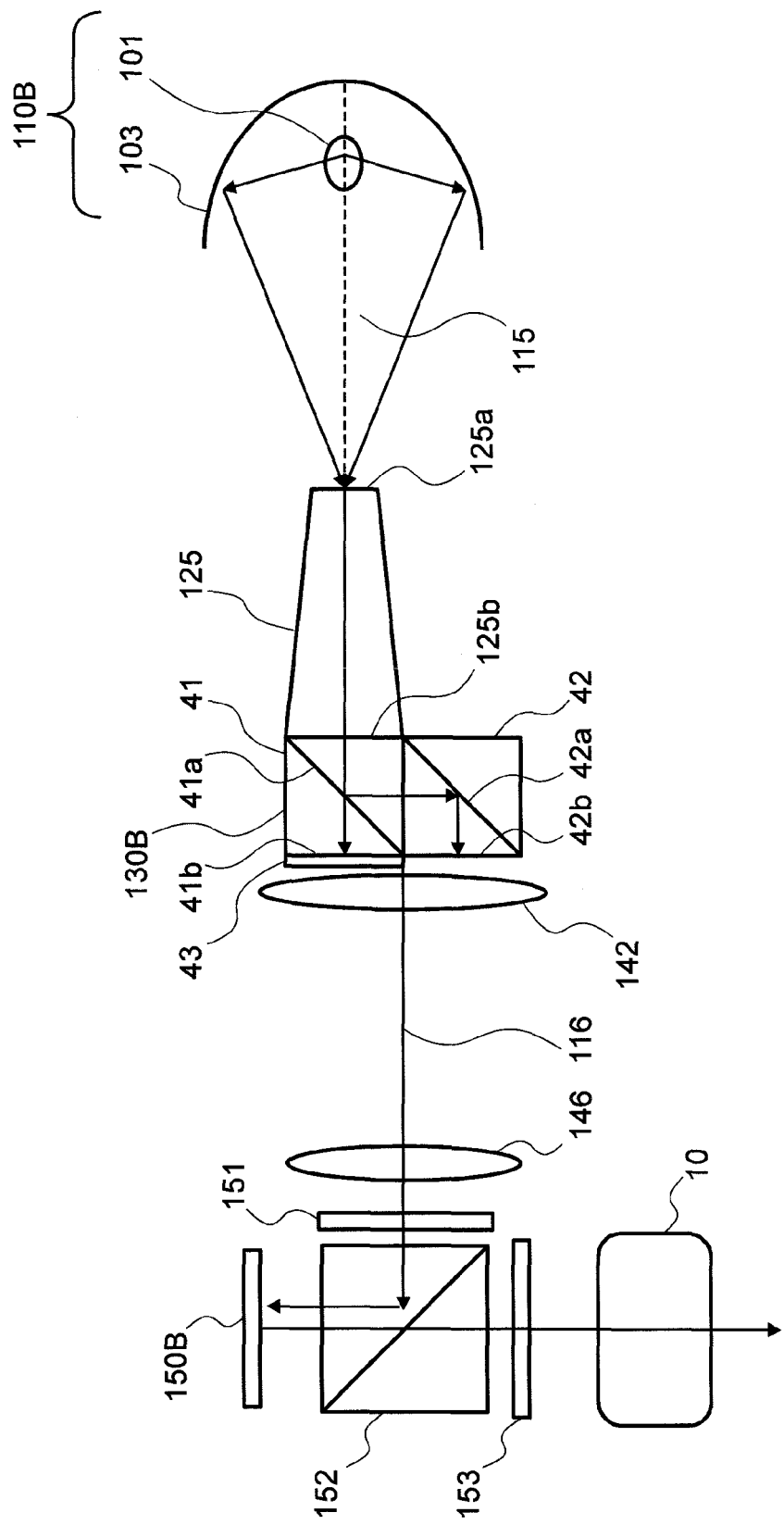
FIG. 14 is a view for diagrammatically showing a lighting apparatus, according to an embodiment 2.

FIG. 14 is a view for diagrammatically showing the structures of the light device, according to the embodiment 2.

As is shown in FIG. 14, the light device, according to the present embodiment, includes a light source 110B, a light funnel 125, functioning as the integrator, a polarized light conversion element 130B, a light condensing lens 142, a field lens 146, a polarizing plate 151, a polarized light beam splitter prism (hereinafter, being abbreviated as "PBS prism") 152, a reflection-type liquid crystal panel 150B, a polarizing plate 153, a projection device 10, and a Fresnel lens sheet 160. However, in FIG. 14 is omitted the illustration of the Fresnel lens sheet 160 as the optical direction conversion unit, as the constituent elements for building up the lighting apparatus.

The light source 110B comprises a lamp 101 and a reflector 103. The lamp 101 is a white color lamp, such as, the high-pressure mercury lamp, for example. The reflector 103 is disposed so as to cover the lamp 101 from the rear side thereof, and has the reflection surface of configuration in an ellipsoid of revolution, or a spheroid.

The light emitting from the lamp 101, which is disposed at a first focal point of the reflector 103, is reflected upon the reflector 103 having the reflection surface of the spheroid configuration, and is condensed onto an incident surface 125a of the light funnel 125, which is disposed in vicinity of a second focal position of the reflector 103, to be incident thereupon.

Thus, the reflector 103 functions as a light condenser unit for condensing the light emitted from the lamp 101 onto the incident surface 125 of the light funnel 125. Of course, in the similar manner to that of the embodiment 1, it is possible to apply the reflection mirror of the spheroid configuration, as the reflector 103, so as to condense the light onto the incident surface 125a of the light funnel 125.

The light funnel 125 is constructed with a hollow optical pipe (i.e., a light pipe), such as, a kaleidoscope, for example, and has a function of uniformizing (or equalizing) the distribution of the light amount of the incident light, repeating the total reflection of the incident light by a plural number of times. Herein, a light pipe is applied, in which a cross-section area perpendicular to the optical axis 115 comes large, gradually, toward the emission side. However, there may be applied a solid rod lens in the place thereof.

The light beam incident upon the light funnel 125 repeats the total reflection on the side surface of the light funnel, a plural number of times, and is in the condition that the lights of various angles are piled up on the emission surface 125b; i.e., the distribution of light mount becomes uniform. Also, since the cross-sectional configuration of the light funnel 125 comes large on the emission side, then the light beam angle emitting from the emission surface 125b is nearly or almost parallel to the optical axis. The light emitting from the light funnel 125 is incident upon the polarized light conversion element 130B.

The polarized light conversion element 130B includes a PBS prism 41 having a PBS film 41a, which is provided on the emission surface 125b of the light funnel 125, a total reflection prism 42 having a total reflection film 42a, which is disposed on the side, into which the S-polarized light reflecting upon the PBS film 41a of the PBS prism 41 directs, and a λ/2 phase difference plate 43 provided on the emission surface 41b, from which the P-polarized light penetrating through the PBS film 41a of the PBS prism 41 emits.

Among the lights having no polarization, being incident from the light funnel 125 upon the PBS prism 41 of the polarized light conversion element 130B and uniform in the distribution of light amount, the light of S-polarization (i.e., the S-polarized light) is reflected upon the PBS film 41a, to be incident upon the total reflection prism 42, and is reflected upon the total reflection film 42a, thereby emitting from the emission surface 42b of the total reflection prism. Also, the light of P-polarization (i.e., the P-polarized light) incident upon the PBS prism 41 penetrates through the PBS film 41a, to be emitted from the emission surface 41b, and it is further converted into the S-polarized light through the λ/2 phase difference plate 43, to be emitted therefrom. In this manner, the lights having no polarization, being incident upon the polarized light conversion element 130B, are aligned into the S-polarized light through the polarized light conversion element 130B.

However, since upon the polarized light conversion element 130B is incident the light beam, which made nearly parallel to the optical axis 115 through the light funnel 125 extending to the emission side, then it is possible to achieve separation of the polarized lights by means of the PBS film 41a, with high efficiency. Also, the configuration of the emission surface of the polarized light conversion element 130B, which is made up with the emission surfaces 41b and 41b, is almost analogous to that of the reflection-type liquid crystal panel 150B.

The light condenser lens 142 is a relay lens for mapping the emission surface of the polarized light conversion element 130B onto the reflection-type liquid crystal panel 150B.

The S-polarized light emitting from the polarized light conversion element 130B is condensed through the light condenser lens 142, is made nearly parallel to the optical axis, by the function of the field lens 146, and it passes through the polarizing plate 151 and reflected upon the PBS prism 152, thereby to be incident upon the reflection-type liquid crystal panel 150B.

Since the modulation light image is made of the P-polarized light, which is formed through modulation by the reflection-type liquid crystal panel 150B, then this time, it penetrates through the PBS prism 152, and it is increased in the contrast thereof by the polarizing plate 153, thereby to be enlarged and projected through the projection device 10 toward the image display liquid crystal panel.

Embodiment 3

Explanation will be made on a direct-view type image display apparatus, according to an embodiment 3, for achieving further cost down thereof, by referring to FIG. 15.

The image display apparatus, according to the present embodiment, differs from the embodiment 2 mentioned above, in an aspect that a color wheel is disposed in vicinity of the incident surface 125a of the light funnel 125, as a time-division color separation unit. With using the color wheel, it is possible to achieve time-division display (i.e., sequential color display) of a color image, on the image display light modulation unit for conducting a monochromatic display (i.e., white-black display). Accordingly, in case when applying the liquid crystal panel to be the image display light modulation unit, it is possible to omit a color filter that must be equipped with the liquid crystal panel for conducting a color display. Also, in case when conducting the color display, though one (1) pixel is constructed with a set of color pixels (i.e., R-pixel, G-pixel, and B-pixel), however in case of the monochromatic display, since the display is made by one (1) pixel, then it is possible to use a panel having a less number of pixels, as a whole. Then, it is possible to achieve the cost down.

Figure 15:
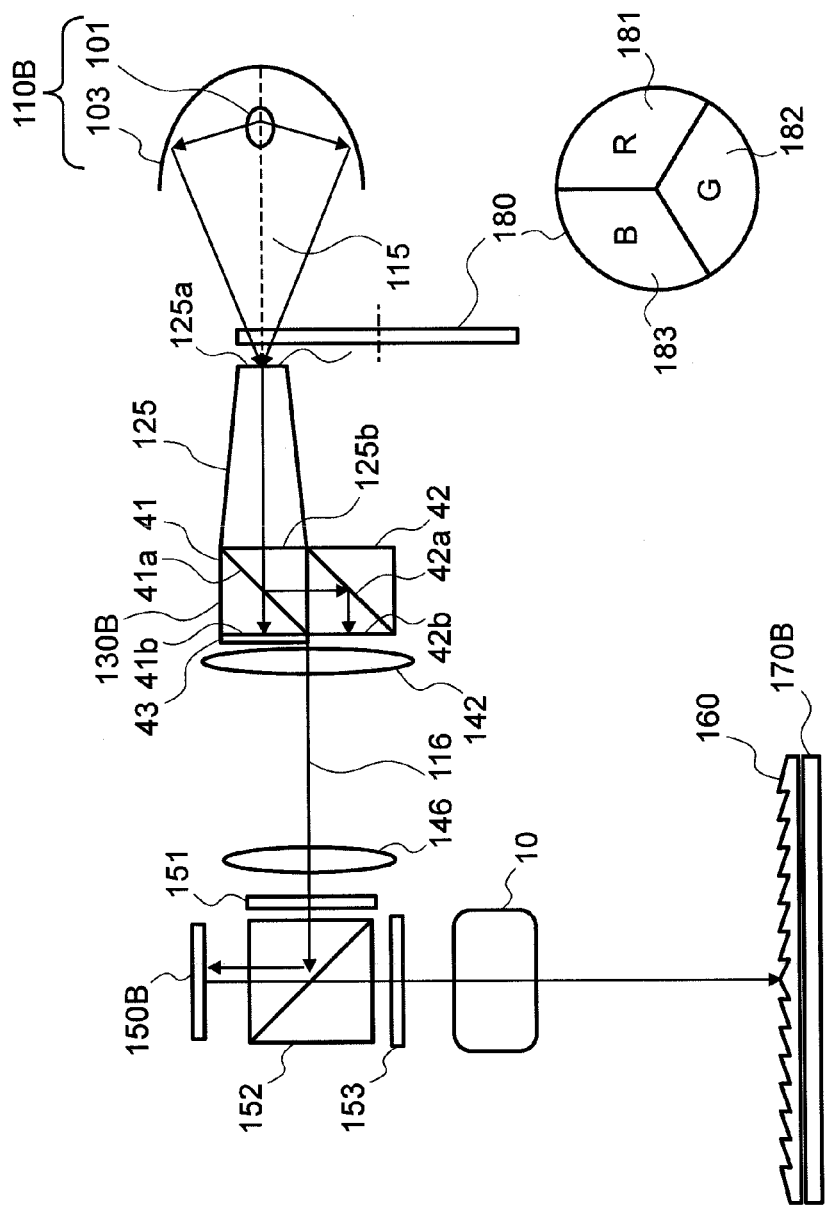
FIG. 15 is a view for diagrammatically showing a video display apparatus, according to an embodiment 3.

FIG. 15 is a view for showing the diagrammatic structures of the image display apparatus, according to the embodiment 3.

In FIG. 15, a reference numeral 180 depicts a color wheel, and 170B a image display liquid crystal panel for conducting the monochromic display mentioned above.

The color wheel 180 is a disc, being made up with a R-light filter 181 for penetrating through a R-light (red color light), a G-light filter 182 for penetrating through a G-light (green color light), and a B-light filter 183 for penetrating through a B-light (blue color light), each extending in the peripheral direction, at a predetermined ratio thereof, and has a rotation axis (not shown in the figure) at a center thereof, to be rotated by a driver unit not shown in the figure at high speed. The color wheel 180 being constructed in this manner is disposed, between the light source 110B and the light funnel 125, in the vicinity of the incident surface 125a of the light funnel 125.

The focus light of nearly white color emitted from the light source 110B is separated, time-sequentially, by means of the color wheel 180, into R-light, G-light and B-light.

And, the color light, upon which the color separation is made through the color wheel 180 is incident upon the light funnel 125, and after being equalized or uniformed in the light amount distribution thereof, comes to be the S-polarized light upon the polarized light conversion element 130B, and further modulated upon the reflection-type liquid crystal panel, and the said light modulation image is irradiated, enlargedly, upon the image display liquid crystal panel 170B, by the projection device 10. The image display liquid crystal panel 170B conducts the light modulation upon the modulation light image irradiated thereupon, so as to build up an image of high contrast. Through such processes, an image of the R-light, and image of G-light and an image of B-light are formed on the image display liquid crystal panel 170B, time-sequentially, and are visually acknowledged, as a color image.

According to the present embodiment, it is possible to achieve the cost down of the color direct-view type image display apparatus.

However, in the above is applied the reflection-type liquid crystal panel to be the light modulation unit for use of light modulation, but may be applied the micro mirror, in the place thereof. Since the micro mirror is larger in the contrast ratio than the liquid crystal panel, therefore it can be applied, more preferably.

By the way, within the embodiments mentioned above, the image display liquid crystal panel 170B was motioned to comprise the polarizing plates on both, the incident side and the emission side thereof. However, in case of the direct-view type image display apparatus, the screen size thereof is large. Then, when applying the liquid crystal panel as the light modulation unit for light modulation, it is possible to delete the incident side polarizing plate of the image display liquid crystal panel 170B, if increasing a degree of polarization, with provision of two (2) pieces of the polarizing plates to be disposed in front or rear of the liquid crystal panel on the optical path thereof, for example, the polarizing plates on the emission side thereof. In this case, the size of the polarizing plate accompanying with the liquid panel is nearly equal to the liquid crystal panel, and then the cost down obtained by deleting the polarizing plate on the incident side of the image display liquid crystal panel 170B is larger than that obtained by the two-pieces structure of the polarizing plate on the emission side, and therefore, it is possible to achieve the cost down of the direct-view type image display apparatus. Also, in case when applying the micro mirror to be the light modulation unit for light modulation, since the contrast ratio sufficiently can be obtained larger than that by the liquid crystal panel, there is a possibility of deleting the polarizing plate on the incident side of the image display liquid crystal panel 170B.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A display apparatus, comprising:
a light source which is configured to emit a light;
a first light modulation unit which is configured modulate the light emitted from said light source;
a first drive unit which is configured to drive said first light modulation unit;
a projection unit, which is configured to project the light from said first light modulation unit enlargedly;
a second light modulation unit, which is configured to modulate the light emitted from said projection unit so as to be emitted to an observer side;
a second drive unit which is configured to drive said second light modulation unit; and
an optical direction conversion unit, which is configured to convert the light from said projection unit so that the light is incident upon an incident surface of said second light modulation unit in a direction approximately perpendicular thereto.

2. The display apparatus, as described in claim 1, wherein said second light modulation unit is a liquid crystal panel.

3. The display apparatus, as described in claim 2, wherein said first light modulation unit is smaller than said second light modulation unit.

4. The display apparatus, as described in claim 1, wherein said optical direction conversion unit is a Fresnel lens sheet.

5. The display apparatus, as described in claim 2, wherein said second light modulation unit has polarizing plates on an incident side and an emission side of said second light modulation unit.

6. The display apparatus, as described in claim 1, wherein said light source comprises a lamp, and a reflector covering said lamp from a reverse side thereof for reflecting the light from said lamp to convert the light into a parallel light.

7. The display apparatus, as described in claim 1, wherein the following relation is satisfied:

$$10 < L1/L2 < 150$$

where a screen size of said second light modulation unit is L1, and a screen size of said first light modulation unit is L2.

8. The display apparatus, as described in claim 4, wherein said Fresnel lens sheet has a refractive type Fresnel lens, which is configured to refract the light which is within a predetermined value of an incident angle so as to be emitted therefrom, and a total-reflection type Fresnel lens which is configured to cause a total reflecting of the light which is at least equal to the predetermined value of the incident angle.

9. The display apparatus as described in claim 8, wherein a plurality of said refractive type Fresnel lens and a plurality of said total-reflection type Fresnel lens are formed concentrically.

10. The display apparatus, as described in claim 2, wherein one pixel of said first light modulation unit corresponds to a plurality of pixels of said second light modulation unit.

11. The display apparatus as described in claim 2, wherein one pixel of said first light modulation unit corresponds to a one pixel of said second light modulation unit.

12. The display apparatus as described in claim 5, wherein said light source comprises at lest one of a high-pressure mercury lamp, a LED and a laser.

13. The display apparatus as described in claim 1, wherein said first light modulation unit and said light source are exchangeable, respectively.

14. The display apparatus as described in claim 1, wherein said projection unit comprises the following, being disposed, sequentially, from the incident surface of said second light modulation unit to said first light modulation unit;
   a first mirror including a rotationally asymmetric reflection surface; and
   a first lens group having at least a rotationally asymmetric lens located on a side of said first mirror facing to said first light modulation unit, and a second lens group having a positive refraction power.

15. The display apparatus as described in claim 14, wherein an effective cross-section size of said first mirror in direction perpendicular to a screen surface and an effective cross-section size of a portion close to said second light modulation unit differs, with respect to an optical axis of said projection unit.

16. The display apparatus as described in claim 15, wherein at least one piece of a flat surface second mirror is disposed between said first mirror and said second light modulation unit.

* * * * *